United States Patent [19]
Bielby et al.

[11] Patent Number: 5,644,680
[45] Date of Patent: Jul. 1, 1997

[54] UPDATING MARKOV MODELS BASED ON SPEECH INPUT AND ADDITIONAL INFORMATION FOR AUTOMATED TELEPHONE DIRECTORY ASSISTANCE

[75] Inventors: Gregory J. Bielby, Pointe Claire; Vishwa N. Gupta, Brossard; Lauren C. Hodgson, Beaconsfield; Matthew Lennig; R. Douglas Sharp, both of Westmount; Hans A. Wasmeier, Ottawa, all of Canada

[73] Assignee: Northern Telecom Limited, Montreal, Canada

[21] Appl. No.: 452,191

[22] Filed: May 25, 1995

Related U.S. Application Data

[62] Division of Ser. No. 227,830, Apr. 14, 1994, Pat. No. 5,488,652.

[51] Int. Cl.[6] ........................................................ G10L 5/06
[52] U.S. Cl. ............................................ 395/2.49; 395/265
[58] Field of Search ................................ 381/43; 371/67; 395/2.45, 2.46, 2.48, 2.49, 2.53, 2.65

[56] References Cited

U.S. PATENT DOCUMENTS

| | | | |
|---|---|---|---|
| 4,164,025 | 8/1979 | Dubnowski et al. | 379/213 |
| 4,751,737 | 6/1988 | Gerson et al. | 381/43 |
| 4,797,910 | 1/1989 | Daudelin | 379/67 |
| 4,959,855 | 9/1990 | Daudelin | 379/213 |
| 4,979,206 | 12/1990 | Padden et al. | 379/67 |
| 5,050,215 | 9/1991 | Nishimura | 381/43 |
| 5,052,038 | 9/1991 | Shepard | 379/88 |
| 5,091,947 | 2/1992 | Ariyoshi et al. | 379/88 |
| 5,097,509 | 3/1992 | Lennig | 381/45 |
| 5,127,055 | 6/1992 | Larkey | 381/43 |
| 5,181,237 | 1/1993 | Dowden | 379/88 |
| 5,204,894 | 4/1993 | Darden | 379/213 |
| 5,274,695 | 12/1993 | Green | 379/88 |
| 5,307,444 | 4/1994 | Tsuboka | 381/43 |

OTHER PUBLICATIONS

"Automated Bilingual Directory Assistance Trial in Bell Canada", Lennig et al, IEEE Workshop on Interactive Voice Technology for Telecom Applications, Piscataway, NJ, Oct. 1992.

"Unleashing the Potential of Human–to–Machine Communication", Labov and Lennig, Telesis, Issue 97, 1993, pp. 23–27.

"An Introduction to Hidden Markov Models", Rabiner and Juang, IEEE ASSP Magazine, Jan. 1986, pp.4–16.

Putting Speech Recognition to Work in the Telephone Network, Lennig, "Computer", published by IEEE Computer Society, vol. 23, No. 8, Aug. 1990.

"Flexible Vocabulary Recognition of Speech Over the Telephone", Lennig et al, IEEE Workshop on Interactive Voice Technology for Telecom Applications, Piscataway, NJ, Oct. 1992.

(List continued on next page.)

*Primary Examiner*—Allen R. MacDonald
*Assistant Examiner*—Robert C. Mattson
*Attorney, Agent, or Firm*—C. W. Junkin

[57] ABSTRACT

In methods and apparatus for at least partially automating a telephone directory assistance function, directory assistance callers are prompted to speak locality or called entity names associated with desired directory listings. A speech recognition algorithm is applied to speech signals received in response to prompting to determine spoken locality or called entity names. Desired telephone numbers are released to callers, and released telephone numbers are used to confirm or correct at least some of the recognized locality or called entity names. Speech signal representations labelled with the confirmed or corrected names are used as labelled speech tokens to refine prior training of the speech recognition algorithm. The training refinement automatically adjusts for deficiencies in prior training of the speech recognition algorithm and to long term changes in the speech patterns of directory assistance callers served by a particular directory assistance installation. The methods can be generalized to other speech recognition applications.

11 Claims, 15 Drawing Sheets

OTHER PUBLICATIONS

"Dynamic Adaptation of Hidden Markov Model for Robust Speech Recognition", 1989 IEEE International Symposium on Circuits and Systems, vol. 2, May 1989, pp. 1336–1339.

"Dynamic Modification of the Vocabular of a Speech Recognition Machine", IBM Technical Disclosure Bulletin, vol. 27, No. 7A, Dec. 1984.

"Adaptive Acquisition of Language", Gorin et al, Computer Speech and Language, vol. 5, No. 2, Apr. 1991, London, GB, pp. 101–132.

UPDATING MARKOV MODELS BASED ON SPEECH INPUT AND ADDITIONAL INFORMATION FOR AUTOMATED TELEPHONE DIRECTORY ASSISTANCE

This application is a divisional application of application Ser. No. 08/227,830, filed on Apr. 14, 1994, now U.S. Pat. No. 5,488,652 in the name of G. J. Bielby et al, and entitled: "METHODS AND APPARATUS FOR AUTOMATING DIRECTORY ASSISTANCE FUNCTIONS". The specification and drawings of application Ser. No. 08/227,830 are hereby incorporated by reference.

FIELD OF INVENTION

This invention relates to methods and apparatus for automatically performing desired actions in response to spoken requests. It is particularly applicable to methods and apparatus for automatically providing desired information in response to spoken requests, as may be used to partially or totally automate telephone directory assistance functions.

BACKGROUND OF INVENTION

In addition to providing printed telephone directories, telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle billions of directory assistance calls per year, the associated labour costs are very significant. Consequently, telephone companies and telephone equipment manufacturers have devoted considerable effort to the development of systems which reduce the labour costs associated with providing directory assistance services.

In handling a typical directory assistance call, an operator may first ask a caller for the locality of the person or organization whom the caller wishes to call. If the locality named by the caller is one for which the operator has no directory listings, the operator may refer the caller to a different directory assistance telephone number which is associated with the requested locality. If the operator does have directory listings for the requested locality, the operator may ask the caller for the name of the person or organization whom the caller wishes to call. The operator searches a directory database for a listing corresponding to the requested person or organization and, upon finding an appropriate listing, releases the telephone number of that listing to the caller.

The labour cost associated with providing directory assistance services can be reduced by partially or totally automating functions previously performed by human operators. U.S. Pat. No. 4,979,206 discloses use of an automatic speech recognition system to automate directory assistance operator functions. Directory assistance callers are automatically prompted to spell out names of localities and people or organizations associated with desired listings. The automatic speech recognition system attempts to recognize letter names in the spoken responses of the callers and, from sequences of recognized letter names, recognizes names of desired localities, people or organizations. The system then automatically searches a directory database for the desired listings and, if appropriate listings are found, the system automatically releases the telephone numbers of the listings to the callers. The system may also complete the desired connections for the callers. If the system is unable to recognize spoken letter names or cannot find appropriate listings, callers are connected to human operators who handle the calls in the normal manner described above. (U.S. Pat. No. 4,979,206 issued Dec. 18, 1990 in the names of F. W. Padden et al, is entitled "Directory Assistance Systems", and is hereby incorporated by reference.)

The speech recognition system of the directory assistance system disclosed in U.S. Pat. No. 4,979,206 has a recognition vocabulary of less than 50 words (the names of twenty six letters, the names of ten digits, "yes" and "no"). The use of such a restricted recognition vocabulary simplifies design and training of the speech recognition system. However, the restricted recognition vocabulary makes the directory assistance system cumbersome and time-consuming for callers to use. Faced with the inconvenience of spelling out the requested information, some callers may refuse to use the automated directory assistance system, forcing the system to connect them to a human operator, and this erodes the labour cost savings that automation is intended to provide.

Lennig et al disclose an automated directory assistance system which is based on a speech recognition system having a recognition vocabulary large enough to contain the names of most localities and several organizations that are likely to be requested by callers to a given directory assistance location ("Automated Bilingual Directory Assistance Trial in Bell Canada", Proceedings of the IEEE Workshop on Interactive Voice Technology for Telecom Applications, October 1992, Piscataway, N.J.). This speech recognition system uses Flexible Vocabulary Recognition (FVR) techniques similar to those disclosed in "Flexible Vocabulary Recognition of Speech over the Telephone", Proceedings of the IEEE Workshop on Interactive Voice Technology for Telecom Applications, October 1992, Piscataway, N.J. and in "Unleashing the Potential of Human-to-Machine Communication", Telesis Number 97, 1993, pp. 22–33 to achieve the expanded recognition vocabulary. These publications are hereby incorporated by reference.

Because the speech recognition system disclosed by Lennig et al can recognize locality and organization names as spoken naturally by callers, there is no need for the callers to spell out these names to obtain desired telephone numbers. Callers are more likely to use directory assistance systems providing this level of convenience, so the saving in labour costs is likely to be higher.

However, to implement a directory assistance system as disclosed by Lennig et al in a real telephone network, the automatic speech recognition system must be "trained" to recognize to a high degree of accuracy all locality names and several organization names likely to be used by directory assistance callers. Such training requires recordings of a large number of local speakers saying the locality and organization names, and each recording (or "speech token") must be labelled as corresponding to a particular locality or organization name. Approximately 20,000 labelled speech tokens are required to train an automatic speech recognition system so that it provides adequate recognition performance for locality and organization names in directory assistance applications.

Typically, it takes several weeks of a skilled speech scientist's time to collect and label approximately 20,000 speech tokens. Even after training with this relatively large sample of speech tokens, the performance of the speech recognition system can be improved further by training with additional labelled speech tokens collected from local speakers.

Moreover, the speech patterns of regions served by directory assistance systems evolve over time, so that the performance of a speech recognition system which is initially well-trained to recognize locality names as spoken by local speakers may deteriorate over time if it is not periodically retrained to allow for changes in local speech patterns.

Consequently, training of speech recognition systems for use in directory assistance applications is a costly and time-consuming enterprise.

SUMMARY OF INVENTION

This invention has, as one of its objects, reduction in the time and expense required for training speech recognition systems to be used in providing directory assistance services and in other applications.

The invention has, as another object, improvement of the long term performance of speech recognition systems used in automated directory assistance systems and in other applications.

One aspect of the invention provides a method for at least partially automating a telephone directory assistance function. According to the method, directory assistance callers are prompted to speak names associated with desired directory listings. Telephone numbers desired by the callers are determined based on speech signals received from the callers in response to the prompting. When the desired telephone numbers are determined, they are released to the callers. The released telephone numbers are used in a parameter modification algorithm to automatically modify parameters of a speech recognition algorithm.

In a very simple embodiment, the released telephone numbers may simply be used to calculate model parameters for a priori probability models which estimate probabilities of callers requesting telephone numbers for listings in particular localities as a function of the callers' telephone numbers. Such a priori models may be used to weight decisions based on acoustic parameters of speech signals in speech recognition algorithms used to recognize locality names spoken by callers when requesting directory listings. Use of the released telephone numbers to refine the a priori models improves the performance of the speech recognition algorithms for particular directory assistance applications.

In more sophisticated embodiments, representations of speech signals received from the callers in response to the prompting may be stored and each stored representation of a speech signal may be associated with a released telephone number. Corresponding locality or called entity names may be derived from the released telephone numbers, and a speech recognition algorithm may be used to determine which of the derived names are most likely to correspond to the representations of speech signals. When the probability of correspondence between a derived name and a stored representation of a speech signal is high enough, the stored representation may be labelled with the derived name and used as a labelled speech token to refine the training of the speech recognition algorithm. The labelled speech tokens may be used to calculate hidden Markov model parameters, a priori model parameters, acceptance criteria probability model parameters and acceptance criteria thresholds used in the speech recognition algorithm.

In effect, the released telephone numbers are used to confirm or correct at least some of the locality or called entity names recognized by the speech recognition algorithm. The parameter modification algorithm uses the labelled speech tokens corresponding to the confirmed and corrected names to refine the training of the speech recognition algorithm. Consequently, the method automatically adjusts for deficiencies in prior training of the speech recognition algorithm and to long term changes in the speech patterns of directory assistance callers served by a particular directory assistance installation. Because the method adjusts automatically to deficiencies in prior training of the speech recognition algorithm, it is expected that automated directory assistance systems can be installed with a smaller initial investment in training of the speech recognition algorithm. Moreover, because the further training of the speech recognition algorithm can be totally automated, it can be made relatively cost-effective and efficient compared to conventional training by speech experts.

The inventive principle can be generalized to apply to other automated systems using speech recognition. Thus, another aspect of the invention provides a method for performing desired actions in response to speech signals. The method comprises storing representations of speech signals and calculating, according to a speech recognition algorithm responsive to the representations of speech signals, measures of probability that the speech signals correspond to each of a plurality of actions in an action vocabulary. Actions from the action vocabulary are selected in response to the calculated measures of probability and automatically performed. Further data indicative of desired actions is acquired, and further measures of probability that the speech signals correspond to actions are calculated according to a speech recognition algorithm responsive to both the representations of the speech signals and the further data. The stored representations of speech signals are labelled in response to the further calculated measures of probability, and speech recognition algorithm model parameters are calculated in response to the labelled stored representations of speech signals.

The selected actions may comprise providing selected items of desired information, as in the directory assistance application, or may comprise other actions (for example typing the spoken words in a speech-driven typewriter application).

The selected actions may comprise prompting speakers to provide further speech signals indicative of desired actions, and the acquistion of further data may comprise calculating, according to a speech recognition algorithm responsive to the further speech signals, measures of probability that the speech signals correspond to each of a plurality of actions. Thus, a prompting scheme having a suitable logical structure may be used to determine the desired action in a series of logical steps.

Speakers may be prompted for confirmation or disconfirmation of desired actions selected in response to previously analyzed speech signals. The prompting may be performed selectively in dependence on the particular actions selected in response to previously analyzed speech signals. In particular, prompting for confirmation or disconfirmation can be avoided for vocabulary items that the speech recognition algorithm is known already to recognize with a high degree of accuracy so as to avoid undue annoyance of speakers and unnecessary processing of training data. Operator-initiated disconfirmations of actions selected in response to previously analyzed speech signals, such as spoken disconfirmations or manual over-rides of the selected actions, may also be monitored and used as further data indicative of desired actions.

Another aspect of the invention provides apparatus for at least partially automating a telephone directory assistance function. The apparatus comprises an on-line processor for at least partially processing directory assistance calls. The on-line processor prompts callers to speak names associated with desired directory listings, stores in call records representations of speech signals received from callers in response to prompting, and records in the call records released telephone numbers received from a directory assistance database to associate each stored representation of a speech signal with a released telephone number. The apparatus further comprises an off-line processor for processing call records created by the on-line processor. The off-line processor modifies parameters of a speech recognition algorithm in response to the released telephone numbers stored in the call records.

The off-line processor may derive corresponding names from each released telephone number by searching a name/number database and execute a speech recognition algorithm to associate selected derived names with selected stored representations of speech signals. The off-line processor may use the selected representations of speech signals and the associated names as labelled speech tokens for training of speech recognition algorithm by modification of its parameters. The off-line processor may download the modified speech recognition algorithm parameters to memory accessible by the on-line processor for use by the on-line processor in handling directory assistance calls.

The apparatus may further comprise an on-line memory for storing on-line programs, call records and on-line speech recognition model parameters and an off-line memory for storing off-line programs, training records, a name/number database and off-line speech recognition model parameters. The call records should be read-accessible by the off-line processor, and the on-line speech recognition model parameters should be write-accessible by the off-line processor.

The apparatus may further comprise a switch interface for interfacing the on-line processor to a switch of a switched telephone network and a directory assistance database interface for interfacing the on-line processor to a directory assistance database. An operator position controller may be connected to the on-line processor via the switch interface and the switch, and may be connected to the directory assistance database via the switch. One or more operator positions may be connected to the operator position controller. An audible response unit may be connected to the directory assistance database and to the switch for audibly releasing telephone numbers of directory listings to directory assistance callers.

BRIEF DESCRIPTION OF DRAWINGS

Embodiments of the invention are described below by way of example only. Reference is made to accompanying drawings in which.

DETAILED DESCRIPTION

Figure 1:
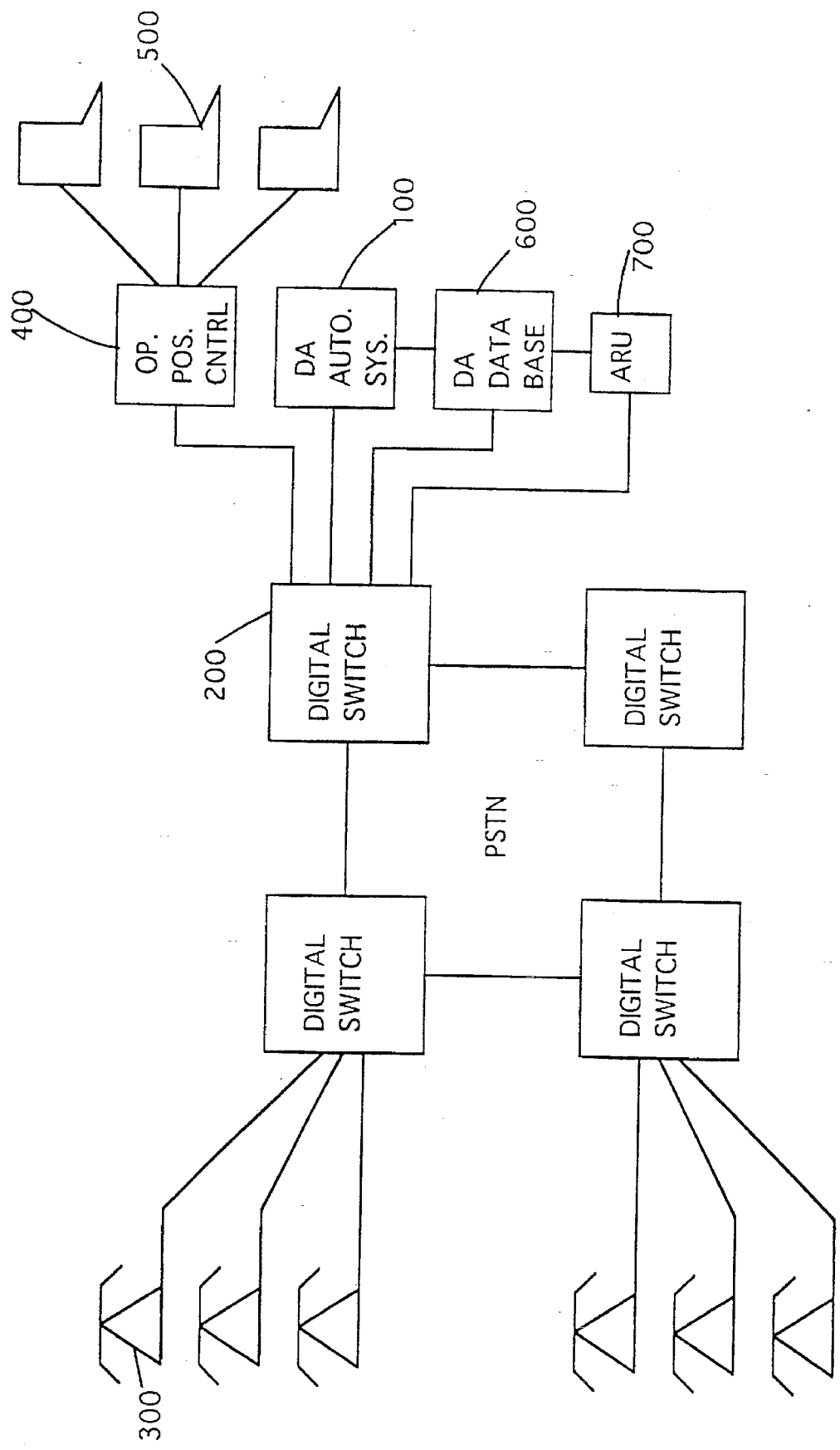
FIG. 1 is a block schematic diagram of a telephone network which includes a directory assistance automation system according to an embodiment of the invention.

FIG. 1 is a block schematic diagram of a telephone network including a directory assistance automation system 100 according to an embodiment of the invention. The directory assistance automation system 100 is connected to a digital switch 200 of a Public Switched Telephone Network (PSTN). Callers wishing directory assistance dial a special directory assistance number on their station sets 300 and are connected to the directory assistance automation system 100 via switches 200 of the PSTN.

The directory assistance automation system 100 is also connected to an operator position controller 400 via the digital switch 200. The operator position controller 400 controls several operator positions 500. Operators at the operator positions 500 can access a directory assistance database 600 via the operator position controller 400 and the digital switch 200. The directory assistance database 600 is connected to an Audio Response Unit (ARU) 700 which is also connected to the digital switch 200. The directory assistance automation system 100 has a direct connection to the directory assistance database 600.

Figure 2:
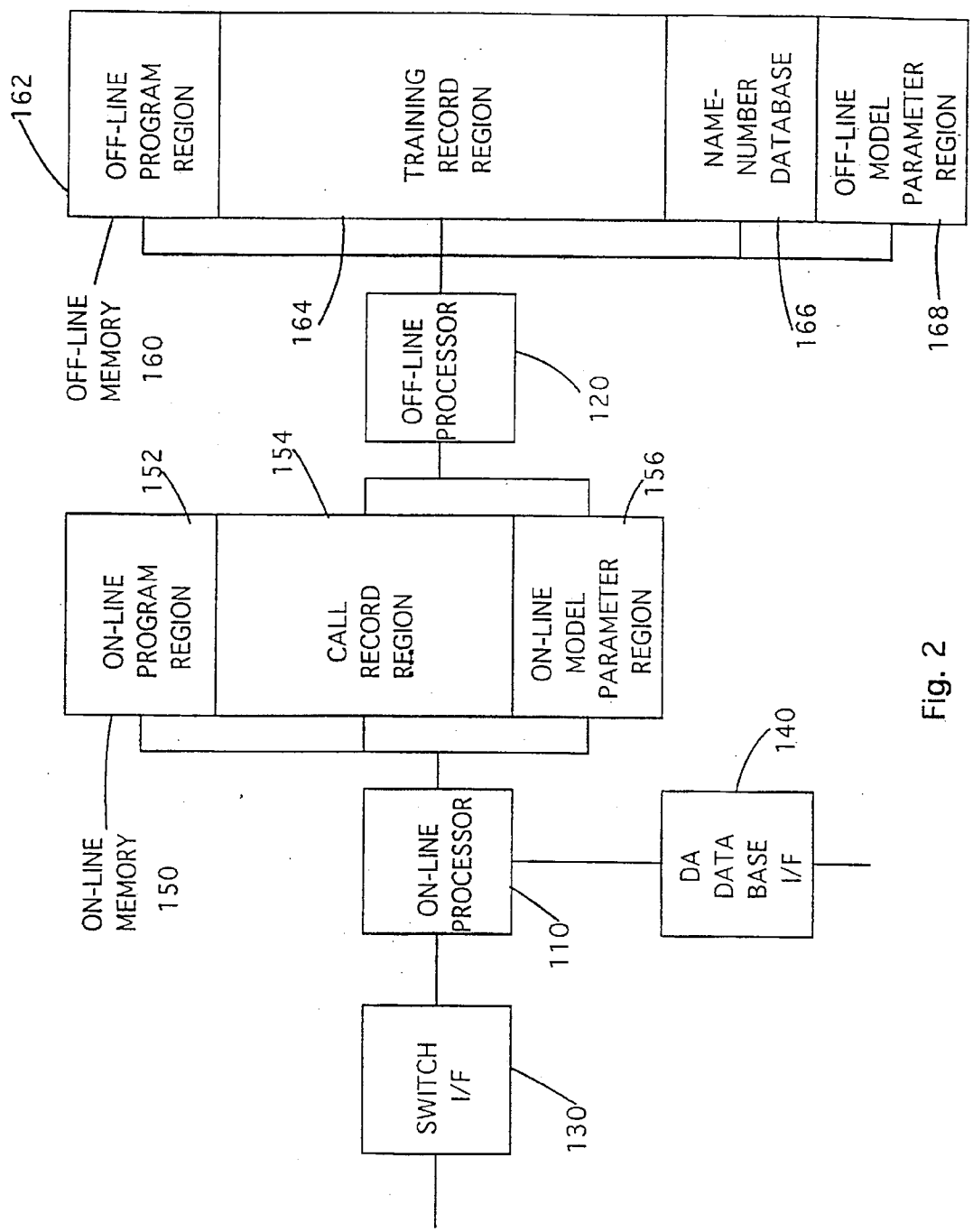
FIG. 2 is a block schematic diagram of the directory assistance automation system of FIG. 1.

FIG. 2 is a block schematic diagram which illustrates the directory assistance automation system 100 in greater detail. The directory assistance automation system 100 comprises an on-line processor 110, an off-line processor 120, two interfaces 130, 140 and memory organized into an on-line memory 150 and an off-line memory 160.

The on-line processor 110 is connected to the digital switch 200 via a switch interface 130 and is connected to the directory assistance database 600 via a directory assistance database interface 140. The on-line processor 110 executes instructions stored in an on-line program region 152 of the on-line memory 150 to process signals received via the switch interface 130 and the directory assistance database interface 140 to generate call records which are stored in a call record region 154 of the on-line memory 150. Some of the instructions executed by the on-line processor 110 require speech recognition model parameters which are stored in an on-line model parameter region 156 of the on-line memory 150.

Figure 3:
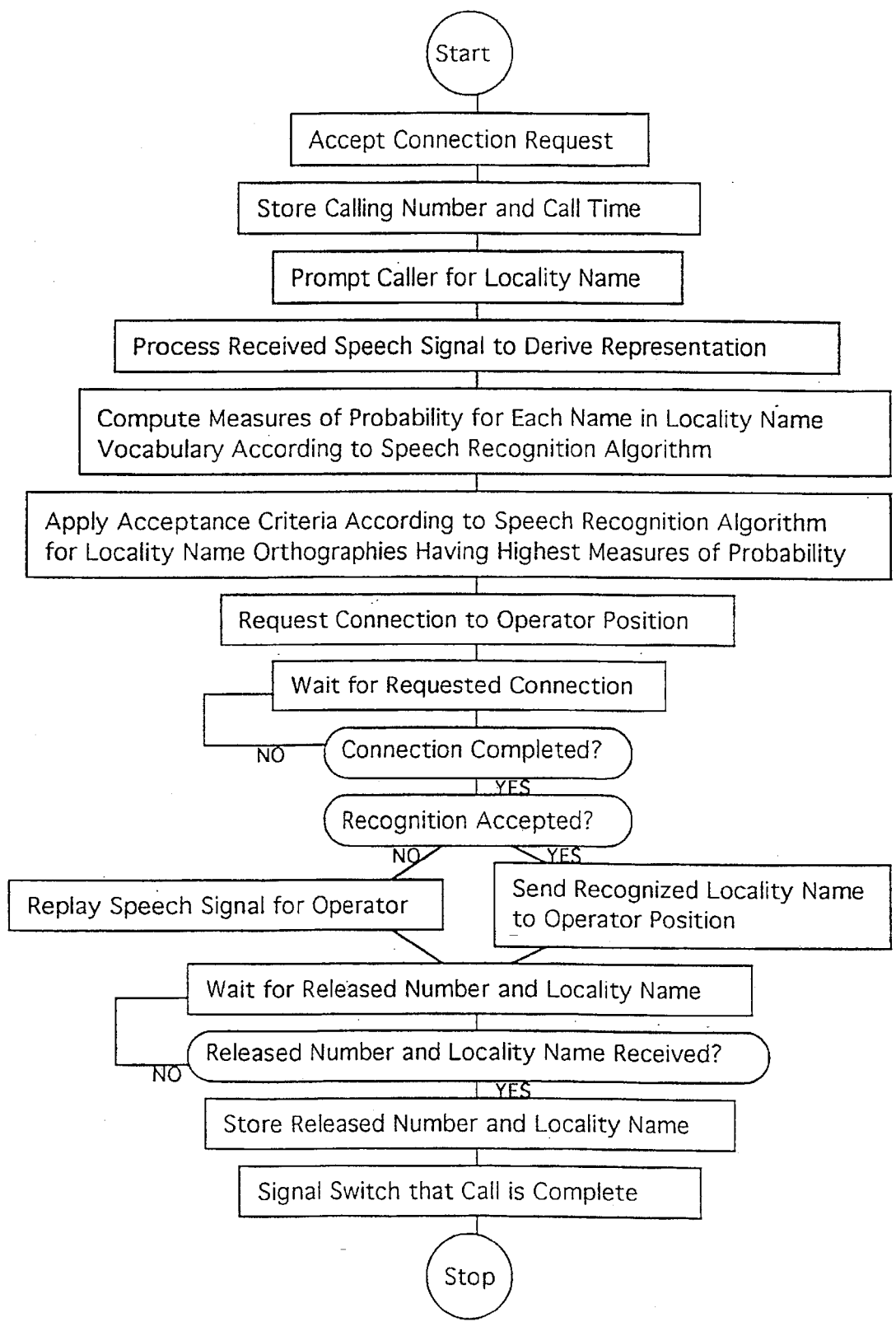
FIG. 3 is a flow chart illustrating operation of the directory assistance automation system of FIG. 2 to handle directory assistance calls.

FIG. 3 is a flow chart which illustrates the operation of the on-line processor 110 when a directory assistance call is received. The caller, who has dialed a directory assistance number on a station set 300 is connected to the directory assistance automation system 100 by digital switches 200 of the PSTN. The on-line processor 110 receives the calling number from the digital switches 200 via the switch interface 130, computes the call time and opens a call record in the call record region 154 of the on-line memory 150, recording an NPA-NXX portion of the calling number and the call time in the call record. The on-line processor 110 then executes instructions stored in the on-line program region 152 of the on-line memory 150 to audibly prompt the caller to speak the name of the locality of the person or organization for which a telephone number is desired.

When a speech signal is received from the caller via the switch interface 130, the on-line processor 110 stores the speech signal and executes instructions stored in the on-line program region 152 of the on-line memory 150 to process the stored speech signal according to a speech processing algorithm thereby deriving a representation of the speech signal which is suitable for input to a speech recognition algorithm. The on-line processor 110 records the representation in the call record and executes further instructions stored in the on-line program region 152 based on model parameters stored in the on-line model parameter region 156 to apply the speech recognition algorithm to the representation of the speech signal thereby computing measures of probability that the speech signal corresponds to each name in a locality name vocabulary. The on-line processor 110 records in the call record indicia corresponding to 30 locality names having the 30 highest measures of probability. The on-line processor 110 then performs further speech recognition calculations as described in greater detail below, including the application of acceptance criteria based on the computed measures of probability to determine whether recognition of the locality name having the highest measures of probability can be accepted.

The on-line processor 110 then executes further instructions stored in the on-line program region 152 of the on-line memory 150 to audibly prompt the caller for further information including the name of the person or organization whom the caller wishes to call, the "called entity name". When a further speech signal is received from the caller via the switch interface 130, the on-line processor 110 stores the further speech signal. These steps are omitted from the flow chart of FIG. 3 for simplicity as they are not essential to an understanding of the invention.

The on-line processor 110 then requests connection to an operator position 500 via the directory assistance database interface 140, the directory assistance database 600 and the digital switch 200 serving the directory assistance automation system 100. When the on-line processor 110 receives an indication from the directory assistance database interface 140 that the requested connection has been completed, the on-line processor 110 sends a signal indicating the recognized locality name (if any) to the directory assistance database 600 via the directory assistance database interface 140. The directory assistance database 600 displays an appropriate screen of information at the operator position 500, the information including the recognized locality name. If no locality name has been recognized, the operator position controller 400 causes the directory assistance database 600 to display a default screen of information at the operator position 500, and the on-line processor 110 transmits the stored speech signal to the operator position controller 400 via the switch interface 130 and the switch 200 for audible replay of the spoken locality name to the operator so that the operator can attempt to recognize the locality name.

The on-line processor 110 also transmits the further stored speech signal to the operator position controller 400 via the switch interface and the switch 200 for audible replay of the spoken called entity name to the operator so that the operator can locate the required listing in the directory assistance database 600. This step is also omitted from the flow chart of FIG. 3 as it is not essential to an understanding of the invention.

The operator position controller 400 completes an audio link between the operator and the caller via the switch 200 so that the operator can request and receive whatever further information is needed to determine what unique telephone number the caller desires. If no locality name has been recognized, the operator determines the correct locality name by asking further questions of the caller, and enters the correct locality name at the operator position.

The operator accesses the directory assistance database 600 via the operator position controller 400 and the switch 200 to display at the operator position 500 whatever directory information is needed to determine the unique telephone number desired by the caller. The operator selects the desired telephone number and disconnects from the call. The operator position controller 400 instructs the directory assistance database 600 to automatically release the desired telephone number to the caller via the ARU 700. (Directory assistance database equipment and operator position controllers having these capabilities are commercially available. For example, Northern Telecom DMS-200 TOPS and Digital Directory Assistance (DDA) or Directory One database products can be configured to provide these functions. DMS, TOPS, DDA and Directory One are trademarks of Northern Telecom Limited.)

The directory assistance database 600 also transmits the released telephone number and the released locality name to the on-line processor 110 via the directory assistance database interface 140. The on-line processor 110 stores the NPA-NXX portion of the released telephone number and the released locality name in the call record. (The released locality name is the locality name appearing on the search screen when the telephone number is released.) If the speech recognition algorithm recognized a locality name, the released locality name is the locality name recognized by the speech recognition algorithm unless the operator has manually entered a correction to the locality name. If the speech recognition algorithm failed to recognize a locality name, the released locality name is the locality name entered by the operator before releasing the telephone number to the caller.

The on-line processor 110 then signals the digital switch 200 via the switch interface 130 that the call is complete, and that the on-line processor 110 is ready to accept the next directory assistance call.

When the directory assistance automation system 100 is able to recognize correctly the locality of the telephone number desired by the caller, it saves the operator the time required to prompt the caller for the locality name and the time required to enter the locality name and to call up the appropriate screen of information from the directory assistance database 600. Unfortunately, when the directory assistance automation system 100 incorrectly recognizes the locality name, it costs the operator the time required to recognize and correct the error. To be of net benefit to the operator, the directory assistance automation system 100 must provide a high percentage of correct recognitions (typically greater than 75%), and a very low percentage of incorrect recognitions (typically less than 1%). Extensive training of the speech recognition algorithm is required to achieve and maintain this level of performance.

At least some of the required training of the speech recognition algorithm is performed automatically by the off-line processor 120 using the call records stored in the call record region 154 of the on-line memory by the on-line processor 110. Referring to FIG. 2, the off-line processor 120 executes instructions stored in an off-line program region 162 of the off-line memory 160 to process call records stored in the call record region 154 of the on-line memory 150 according to a post-recognition algorithm thereby generating training records which are stored in a training record region 164 of the off-line memory 160. The post-recognition algorithm relies on data stored in a Name/Number database region 166 of the off-line memory 160. The off-line processor 120 executes further instructions stored in the off-line program region 162 to process the training records according to a training algorithm thereby generating modified speech recognition algorithm model parameters and to assess the modified speech recognition algorithm. Modifications to the speech recognition algorithm in the form of modified model parameters are stored in an off-line model parameter region 168 of the off-line memory 160. If the assessment indicates that the modified speech recognition algorithm performs significantly better than the speech recognition algorithm currently applied by the on-line processor 110, the off-line processor 120 executes further instructions stored in the off-line program region 162 to download the modified model parameters from the off-line model parameter region 168 of the off-line memory 160 into the on-line model parameter region 156 of the on-line memory 150 when the on-line processor 110 is idle. The on-line processor 110 then uses the modified speech recognition algorithm to achieve better speech recognition performance.

In one embodiment of the directory assistance automation system 100, the speech recognition algorithm for locality names is based on a library of allophone Hidden Markov Models (HMMs). HMMs of two distinct types are associated with each allophone. The HMMs of one distinct type are generated using cepstral feature vectors, and the HMMs of the other distinct type are generated using equalized cepstral vectors. The locality name vocabulary comprises allophone transcriptions of all expected locality names concatenated with expected prefixes and suffixes. Consequently, each locality name in the locality name vocabulary is associated with several HMMs of each distinct type, each of those HMMs comprising a concatenation of allophone HMMs for the allophones in the allophone transcriptions of that locality name.

The speech recognition algorithm also has an a priori component which characterizes the probability that callers having particular NPA-NXX portions of their telephone numbers will request directory listings for particular localities in the locality name vocabulary. The NPA-NXX portion of the caller's telephone number provides an indication of the geographic location of the caller. Intuitively, the probability that the caller will request a given locality is dependent on the population of that locality and on the distance between that locality and the location of the caller. Initial a priori models are based on estimations of these intuitive patterns of calling behaviour.

Figure 4A:
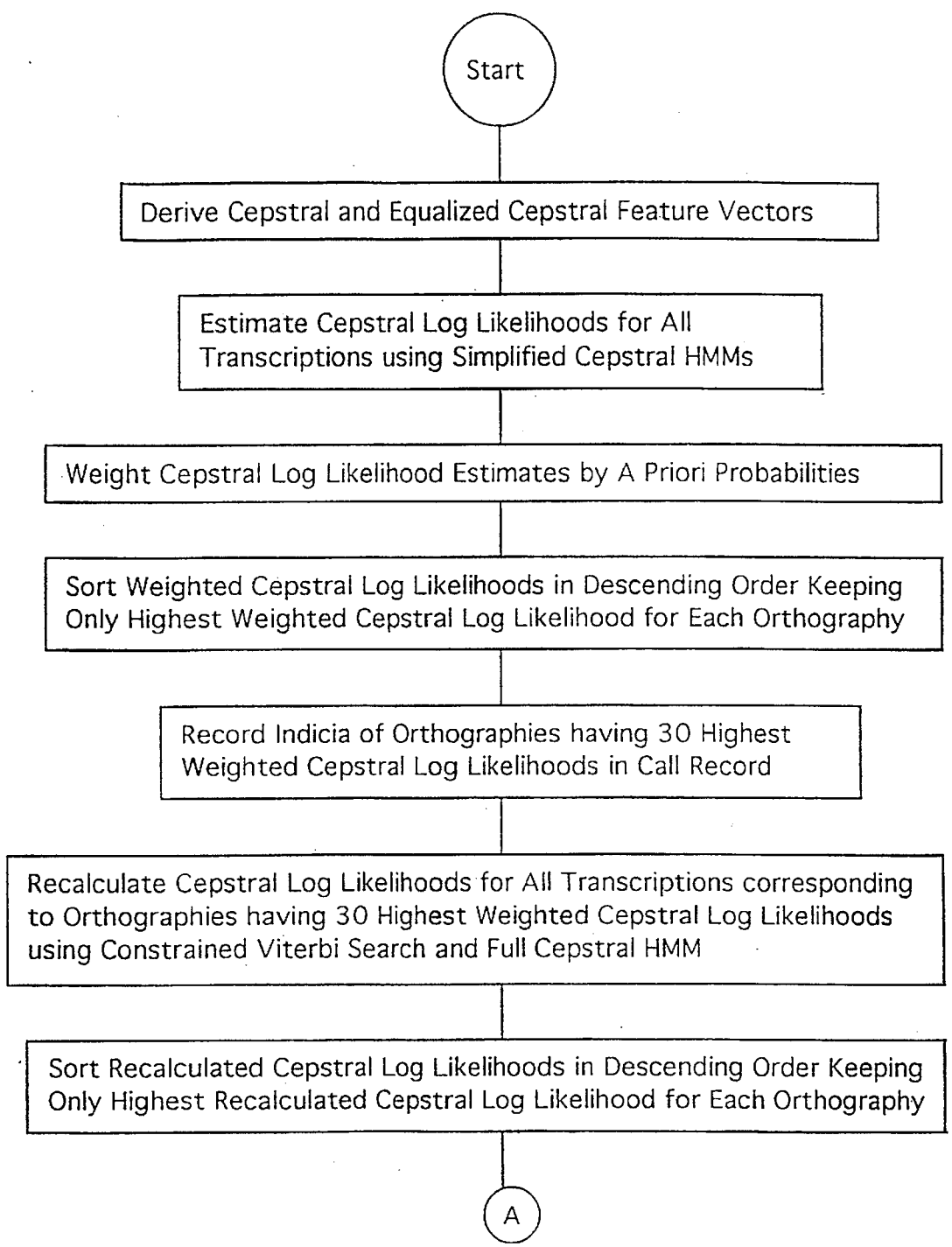
FIGS. 4A and 4B are flow charts illustrating key steps of a speech recognition algorithm used by the directory assistance automation system of FIG. 2.
Figure 4B:
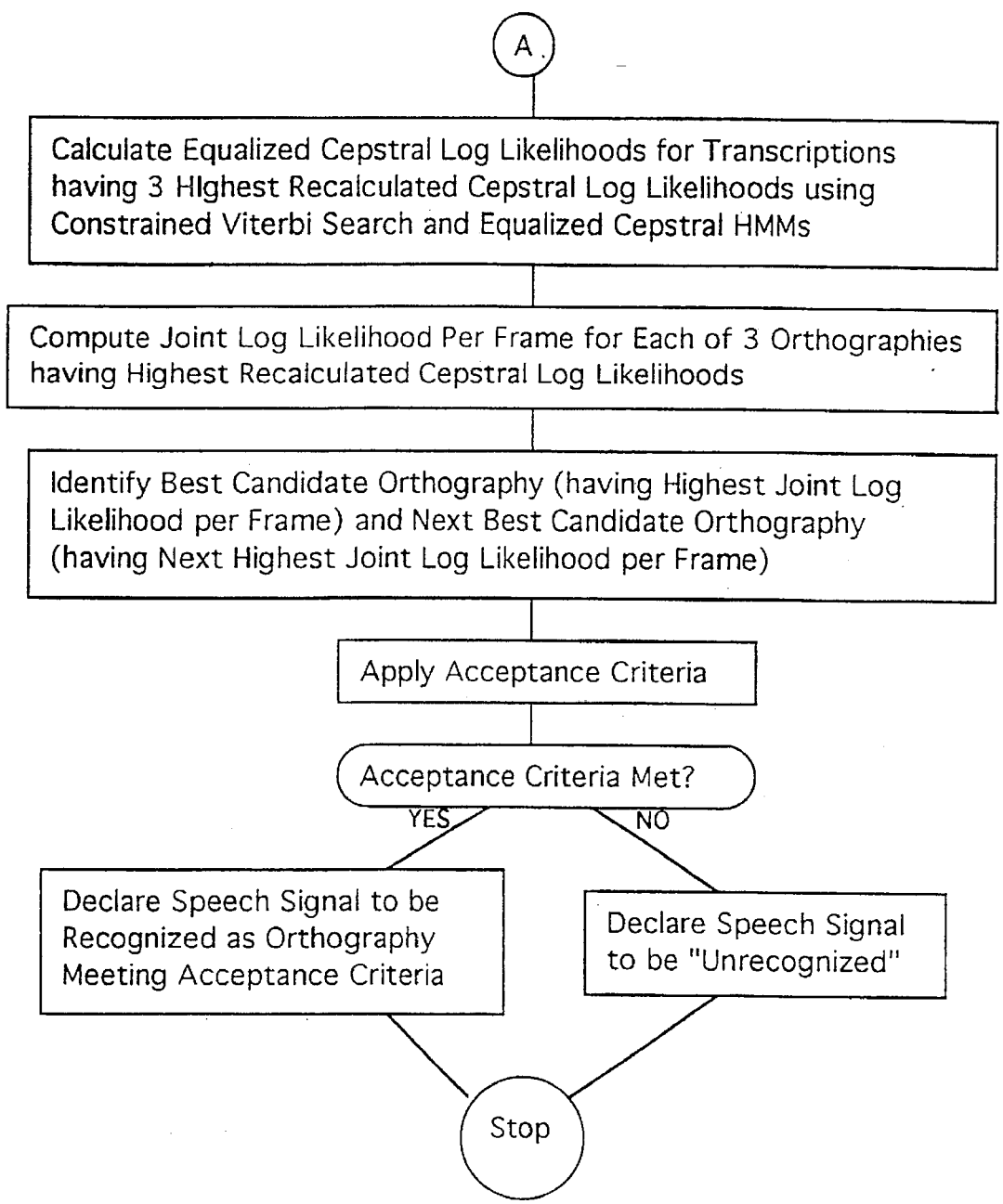

FIGS. 4A and 4B are flow charts which illustrate key steps of the speech recognition algorithm. The on-line processor 110 processes speech signals received in response to automatic prompting to derive a representation of the speech signal in the form of a sequence of cepstral feature vectors and a sequence of equalized cepstral feature vectors. The signal processing steps required to derive these sequences of feature vectors are similar to those described in U.S. Pat. No. 5,097,509. (U.S. Pat. No. 5,097,509 is entitled "Rejection Method for Speech Recognition", issued Mar. 17, 1992 in the name of Matthew Lennig, and is hereby incorporated by reference.) In the flow charts of FIGS. 4A and 4B, locality names are referred to as "orthographies" for greater generality.

A two pass search algorithm similar to that described in U.S. patent application Ser. No. 08/080,543 is used to calculate measures of probability that the sequences of feature vectors are generated by concatenated HMMs corresponding to each locality name transcription in the locality name vocabulary. (U.S. patent application Ser. No. 08/080,543 is entitled "Speech Recognition Method Using Two Pass Search", was filed on Jun. 24, 1993, in the names of Vishwa Gupta et al, and is hereby incorporated by reference.)

In particular, in a first pass of the two pass search algorithm, simplifed cepstral vector based HMMs are used in an abbreviated search algorithm to estimate log likelihoods that the sequence of cepstral feature vectors would be generated by concatenated HMMs corresponding to each locality name transcription for every transcription in the locality name vocabulary. The estimated log likelihood for each locality name transcription is then weighted by the a priori measure of probability that the corresponding locality name would be requested by a caller having the caller's NPA-NXX, calculated according to the a priori models. The weighted log likelihoods of the transcriptions corresponding to each locality name are compared to determine the highest weighted log likelihood for each locality name, and these are sorted into descending order. The locality names having the 30 highest weighted log likelihoods are identified as the 30 best candidates for recognition. A list of indicia corresponding to the locality names having the 30 highest weighted probabilities are recorded in the call record.

In a second step of the two pass search algorithm, more detailed cepstral based HMMs for all locality name transcriptions corresponding to the 30 best candidates for recognition and a constrained Viterbi search algorithm are used to recalculate more accurately the log likelihoods that the cepstral feature vectors would be generated by concatenated HMMs corresponding to each locality name transcription of the 30 best candidates for recognition. Again, the weighted log likelihoods of the transcriptions corresponding to each locality name are compared to determine the highest weighted log likelihood for each locality name, and these are sorted into descending order. The locality names having the three highest weighted log likelihoods are identified as the three best candidates for recognition, and the locality name transcriptions corresponding to those weighted log likelihoods are identified as the three best locality name transcriptions.

Detailed equalized cepstral HMMs for the three best locality name transcriptions and a constrained Viterbi search are then used to calculate the log likelihoods that the equalized cepstral feature vectors would be generated by concatenated HMMs corresponding to the three best locality name transcriptions.

The log likelihoods calculated using cepstral HMM and feature vectors are combined with the log likelihoods calculated using equalized cepstral HMM and feature vectors to compute the joint log likelihood for each of the three best candidates for recognition. The joint log likelihoods are normalized according to the number of frames in the speech signal representation to compute the "joint log likelihood per frame" of each of the three best candidates. (Each feature vector corresponds to one frame of the speech signal representation.) The locality name having the highest joint log likelihood per frame is identified as the best locality name candidate, and the locality name having the second highest joint log likelihood per frame is identified as the next best locality name candidate. The transcription of the best candidate locality name corresponding to the highest joint log likelihood is identified as the best candidate transcription.

Figure 5A:
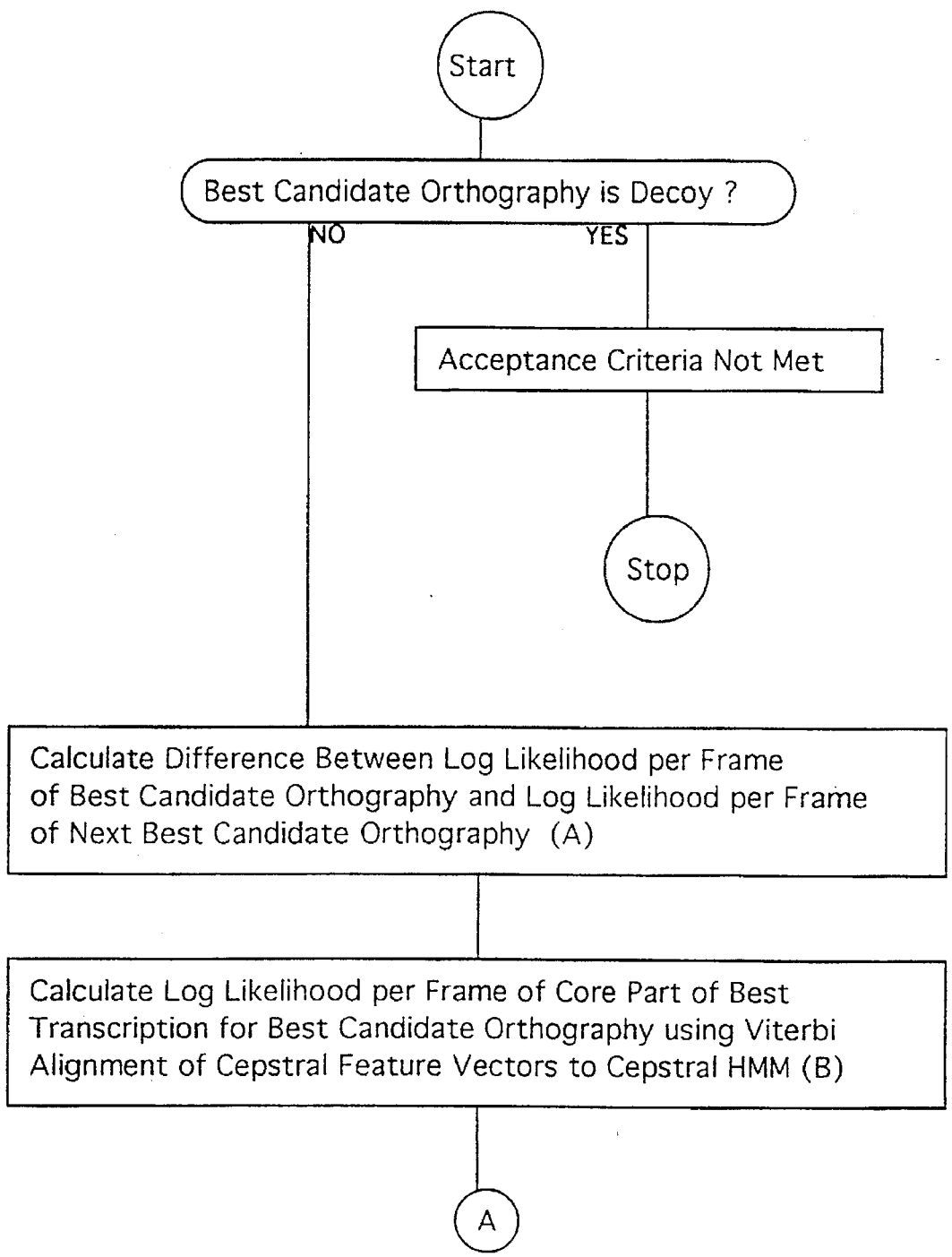
FIGS. 5A and 5B are flow charts illustrating the application of acceptance criteria used by the speech recognition algorithm illustrated in FIGS. 4A and 4B.
Figure 5B:
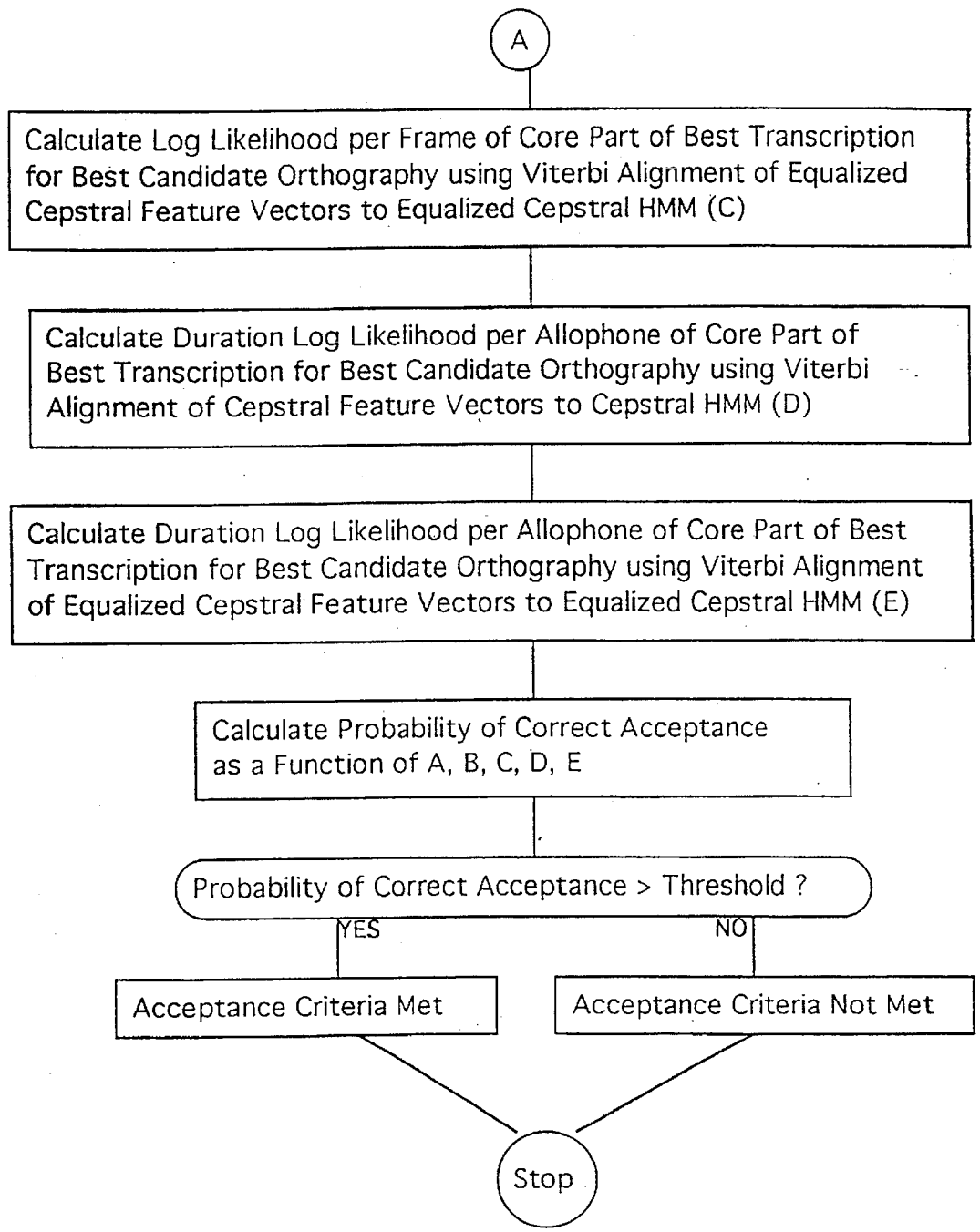

Acceptance criteria are then applied to determine whether recognition of the best locality name candidate can be accepted. FIGS. 5A and 5B are flowcharts illustrating application of the acceptance criteria. In FIGS. 5A and 5B, locality names are referred to as "orthographies" for greater generality.

When callers are prompted by the directory assistance automation system 100 for a locality name, they don't always respond by speaking a locality name. For example, they may respond to the locality name prompt by stating "I don't know". Unless corrective measures are taken, the speech recognition algorithm will try to recognize such spoken responses as locality names in the locality name vocabulary. However, in such cases any locality name recognized by the speech recognition algorithm will be incorrect.

The performance of the speech recognition algorithm is improved by including transcriptions for expected responses that don't correspond to locality names in the locality name vocabulary, and by labelling such transcriptions as "decoys". If the speech recognition algorithm then selects a decoy as the best locality name candidate, the algorithm concludes that no locality name should be recognized. It has been determined that some locality name transcriptions are more likely to be incorrectly recognized than correctly recognized by the speech recognition algorithm. Performance of the speech recognition algorithm may be improved by labelling such transcriptions as decoys even though they actually correspond to legitimate locality names.

If the best candidate locality name transcription is not marked as a decoy in the the locality name vocabulary, five acceptance criteria parameters are calculated. One acceptance criteria parameter (A) is the difference between the log likelihood per frame of the best locality name candidate and the log likelihood per frame of the next best locality name candidate.

To calculate the remaining four acceptance criteria parameters, Viterbi alignment techniques are used to align the feature vectors with the allophone HMMs of the concatenated HMMs corresponding to the best candidate transcription. Feature vectors aligned with allophone HMMs corresponding to prefixes or suffixes of the transcription are discarded, and the remaining feature vectors are used to calculate the log likelihood per frame of the "core part" of the transcription, i.e. that part of the transcription corresponding to the locality name alone. This yields two further acceptance criteria parameters, the log likelihood per frame of the core part of the transcription calculated using cepstral feature vectors and HMM (B) and the log likelihood per frame of the core part of the transcription calculated using equalized cepstral feature vectors and HMM (C).

The Viterbi alignment step used in the calculation of acceptance criteria parameters B and C aligns the feature vectors with the individual allophone HMMs which are concatenated to derive the HMM for each locality name transcription. This alignment permits calculation of the number of frames corresponding to each allophone. Spoken allophones have distributions of durations in normal speech which can be modelled as a Gaussian distributions, the means and standard deviations of which can be estimated by analyzing large samples of spoken allophones. Because each feature vector corresponds to a time slice of the speech signal having a known duration (typically 25.6 ms), the duration of each allophone can be estimated from the alignment of the feature vectors to the allophone HMMs. The estimated allophone durations are compared to the expected distributions of allophone durations to estimate the probability that the Viterbi alignment is a valid one. A "duration probability measure" for the best candidate transcription is calculated by computing the duration log likelihood for each allophone in the core and averaging these log likelihoods over all allophones in the core. This calculation is performed using the Viterbi alignment of the cepstral feature vectors with the cepstral HMM of the core part of the best candidate transcription to provide one duration probability measure (D), and again using the Viterbi alignment of the equalized cepstral feature vectors with the equalized cepstral HMM of the core part of the best candidate transcription to provide another duration probability measure (E).

Probability models corresponding to each of the acceptance criteria parameters (A, B, C, D, E) estimate the probability of correct recognition as functions of the individual acceptance criteria parameters. The values of the acceptance criteria parameters are applied to these models to obtain five measures ($P_a(A)$, $P_b(B)$, $P_c(C)$, $P_d(D)$, $P_e(E)$) of the probability of correct acceptance, and a composite measure (P) of the probability of correct recognition is calculated as weighted product of the five estimates:

$$P=[P_a(A)]^8[P_b(B)][P_c(C)][P_d(D)]^2[P_e(E)]^2$$

The composite measure (P) is compared to an empirically determined threshold. If the composite measure (P) exceeds the threshold, the acceptance criteria are met and the speech signal is declared to be recognized as the best candidate locality name. If the composite measure (P) does not exceed the threshold, the acceptance criteria are not met, and the speech signal is declared to be unrecognized.

Automated training of the speech recognition algorithm described above has five components:

1. generation of training records;
2. training of the allophone HMMs;
3. training of the a priori models;
4. training of the acceptance criteria probability models; and
5. training of the acceptance criteria threshold.

Figure 6A:
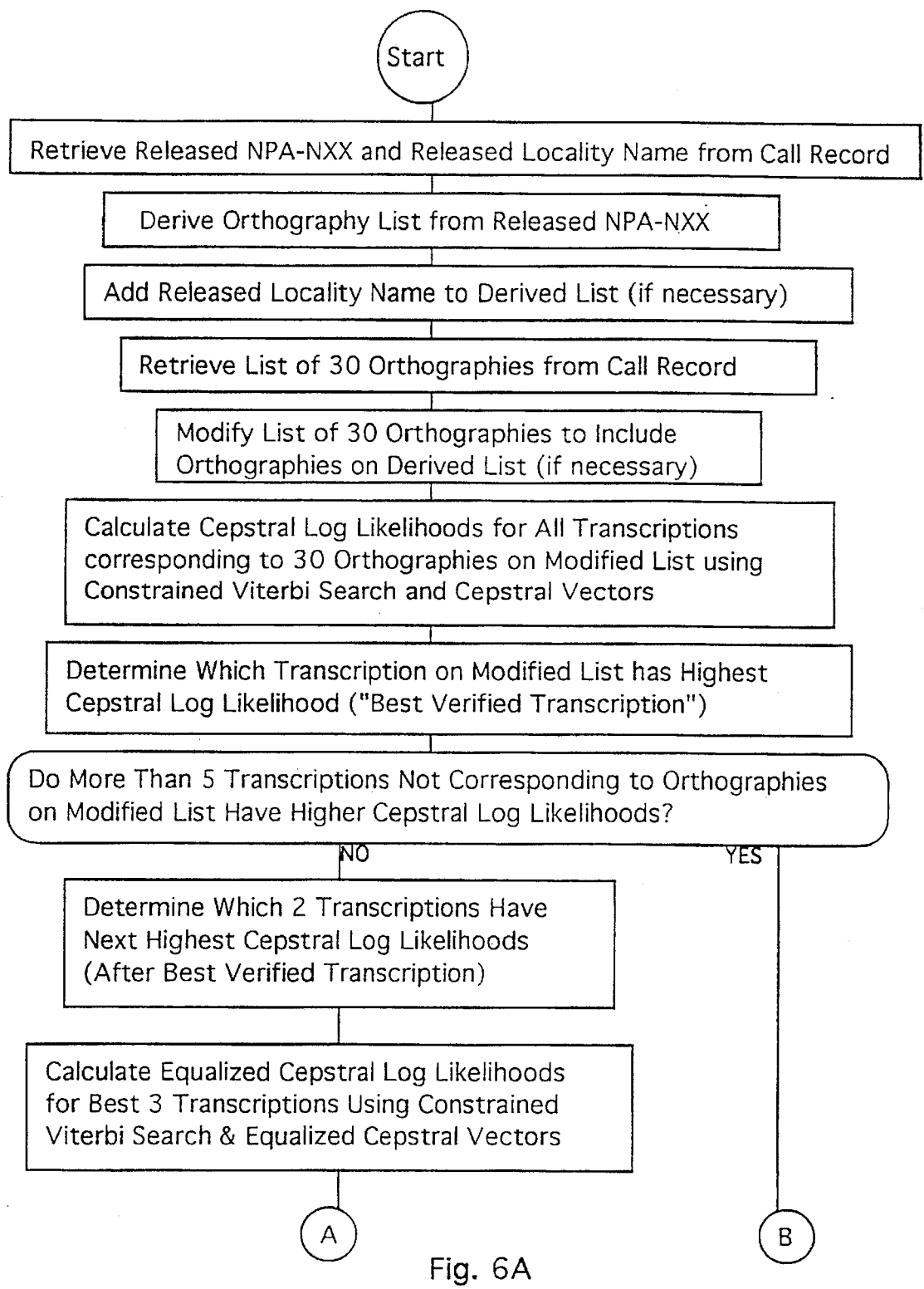
FIGS. 6A and 6B are flow charts illustrating operation of the directory assistance automation system of FIG. 2 to automatically generate training records.
Figure 6B:
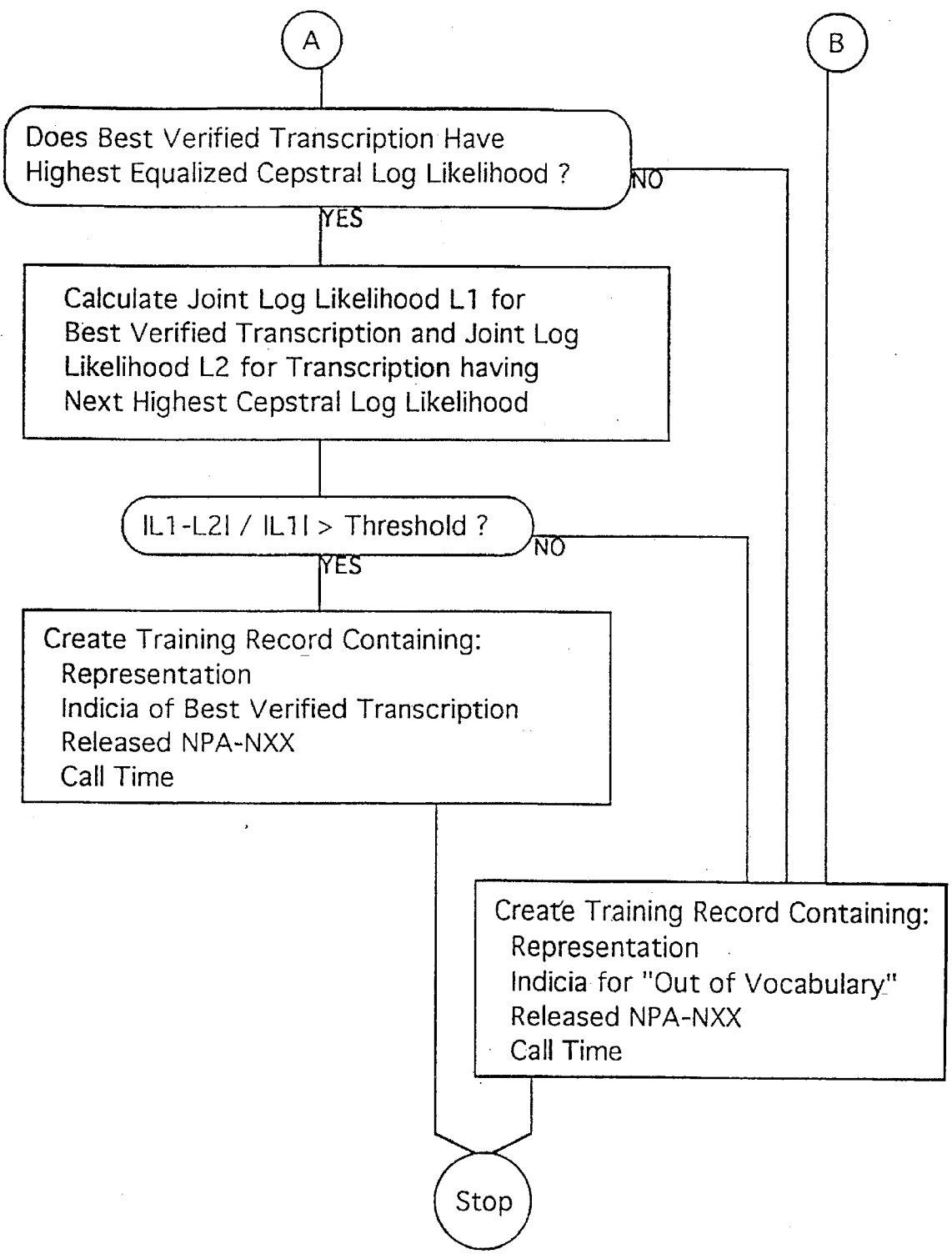

FIGS. 6A and 6B are a flow chart which illustrates the operation of the off-line processor 120 to generate a training record from a call record. In FIG. 6A, "orthography" is used in place of locality name for greater generality.

The off-line processor 120 accesses the call record memory block 160 to retrieve the NPA-NXX portion of the released telephone number and the released locality name for that call record. The off-line processor 120 then accesses the Name/Number database region 166 of the off-line memory 160 to derive a list of locality names that correspond to that NPA-NXX. If the released locality name is not on the derived list, it is added to the derived list.

The off-line processor 120 accesses the call record memory block 160 to retrieve the list of 30 locality names having the highest weighted log likelihoods as estimated during the first pass of the two pass speech recognition algorithm. The list of locality names derived from the Name/Number database 166 is compared to the list of 30 locality names having the highest weighted log likelihoods. If any locality names are on the list derived from the Name/Number database 166 but not on the list of 30 locality name transcriptions, the derived list is modified to add these missing locality names, displacing locality names which are not on the list derived from the Name/Number database 166 and which have the lowest weighted log likelihoods so that the modified list still contains only 30 locality names.

The off-line processor 120 then applies the second pass of the two pass speech recognition algorithm using the concatenated cepstral HMMs for all transcriptions corresponding to the 30 locality names on the modified list to derive log likelihoods that cepstral feature vectors of the call record would be generated by each concatenated HMM. The off-line processor 120 determines which locality name transcription on the modified list has the highest log likelihood, "the best verified transcription". If five or more locality name transcriptions corresponding to locality names not on the modified list have higher log likelihoods, a training record which includes the speech signal representation, the NPA-NXX of the released telephone number, the call time and a label indicating that the speech signal is "out of vocabulary" is created in the training record region 164 of the off-line memory 160.

Otherwise, the off-line processor 120 determines which two locality name transcriptions have the next highest cepstral log likelihoods after the best verified transcription. Equalized cepstral log likelihoods are calculated for these two locality name transcriptions and for the best candidate transcription are calculated using a constrained Viterbi search and the equalized cepstral feature vectors and HMMs. If the best verified transcription does not have the highest equalized cepstral log likelihood, a training record which includes the speech signal representation, the NPA-NXX of the released telephone number, the call time and a label indicating that the speech signal is "out of vocabulary" is created in the training record region 164 of the off-line memory 160.

Otherwise, the off-line processor 120 combines cepstral log likelihoods and equalized cepstral log likelihoods to calculate the joint log likelihood (L1) for the best candidate transcription and the joint log likelihood (L2) for the next best candidate transcription. A normalized difference between these two joint log likelihoods is compared to a threshold. If the normalized difference does not exceed the threshold, the off-line processor 120 creates a training record which includes the speech signal representation, the NPA-NXX of the released telephone number, the call time and a label indicating that the speech signal is "out of vocabulary" is created in the training record region 164 of the off-line memory 160.

Otherwise (i.e. if the normalized difference between the joint log likelihoods does exceed the threshold), the off-line processor 120 creates a training record which includes the speech signal representation, the NPA-NXX of the released telephone number, the call time and a label indicating that the speech signal corresponds to the "best verified transcription" is created in the training record region 164 of the off-line memory 160. (The label uniquely identifies the locality name transcription including any prefix or suffix included in the transcription.)

The process illustrated in FIGS. 6A and 6B is repeated for each call record. The call records are deleted once the training records are generated to make room for new call records in the call record region 154 of the on-line memory 150.

Figure 7:
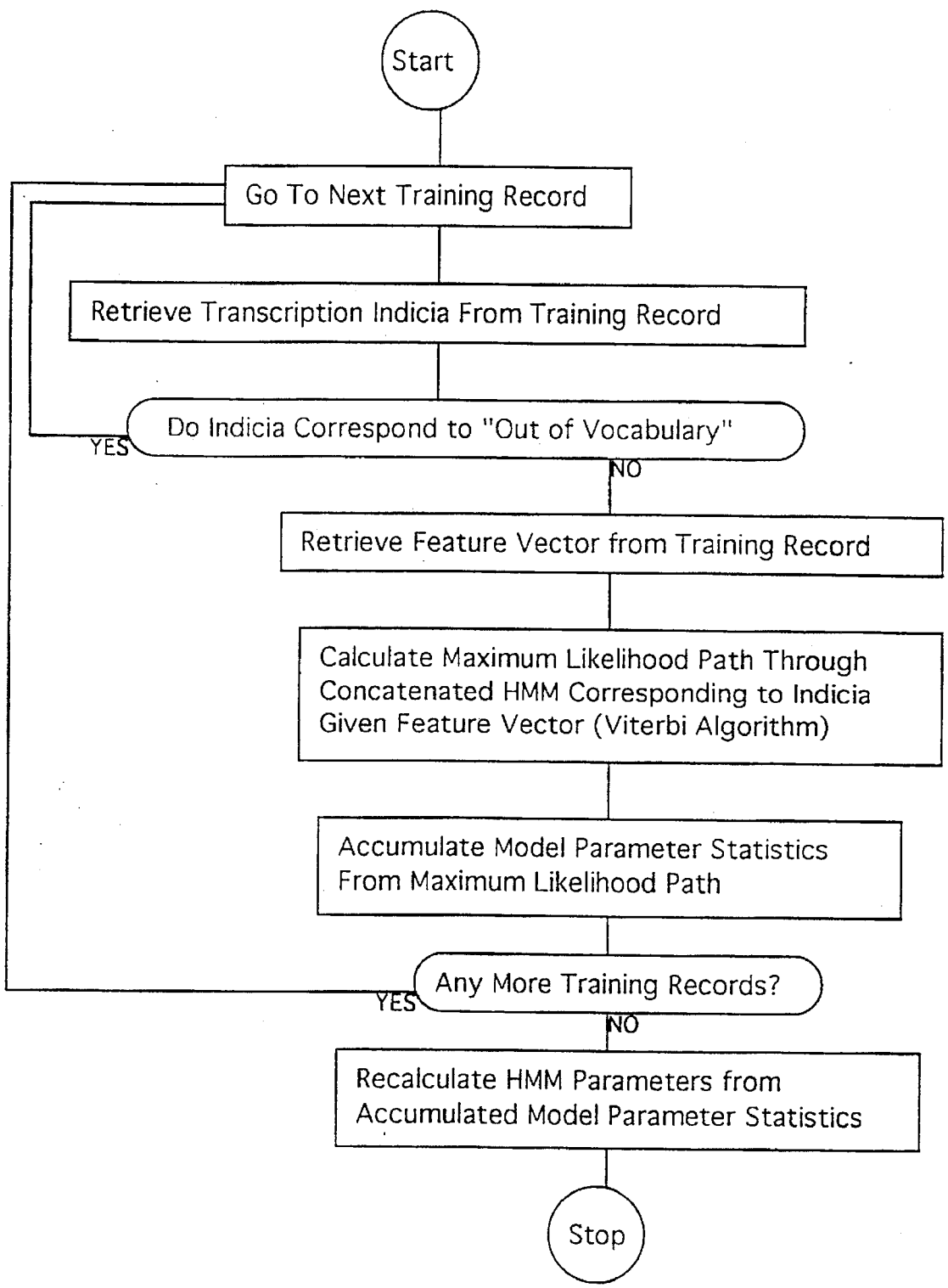
FIG. 7 is flow chart illustrating operation of the directory assistance automation system of FIG. 2 to train allophone Hidden Markov Models (HMMs) used by the speech recognition algorithm illustrated in FIGS. 4A and 4B.

When a large population of training records has been generated, the off-line processor 120 executes training algorithms to train the speech recognition algorithm with the training records. FIG. 7 is a flow chart which illustrates automated training of the allophone HMMs with the training records. The allophone HMMs are initially trained using a large library of speech samples collected and labelled by speech scientists using conventional methods. Further automatic training of the allophone HMMs using the training records employs a single iteration of the known Viterbi algorithm for each usable training record.

In particular, for each sequence of feature vectors labelled as a particular locality name transcription in a training record, the known Viterbi algorithm is used to calculate the maximum likelihood path through the concatenated HMM for that locality name transcription. Statistics descriptive of that maximum likelihood path are counted and added to corresponding statistics accumulated during initial training of the HMM and previous further training of the HMM. The parameters of the allophone HMM are recalculated based on the accumulated model parameter statistics. (See Rabiner et al, IEEE ASSP Magazine, January 1986, pp. 4–16 for a description of the Viterbi algorithm. This paper is hereby incorporated by reference.)

Because the speech recognition algorithm uses both cepstral and equalized cepstral allophone HMMs, each training record includes a sequence of cepstral feature vectors and a sequence of equalized cepstral feature vectors. The cepstral feature vectors are used as described above to train the cepstral allophone HMMs, and the equalized cepstral feature vectors are used as described above to train the equalized cepstral allophone HMMs.

The resulting allophone HMMs may be modified for better performance of the speech recognition as described in U.S. patent application Ser. No. 07/772,903. (U.S. patent application Ser. No. 07/772,903 entitled "Flexible Vocabulary Recognition", was filed in the names of Vishwa Gupta et al on Oct. 8, 1991, and is hereby incorporated by reference.)

The modified model parameters which define the modified HMMs are stored in the off-line model parameter region 168 of the off-line memory 160.

Figure 8:
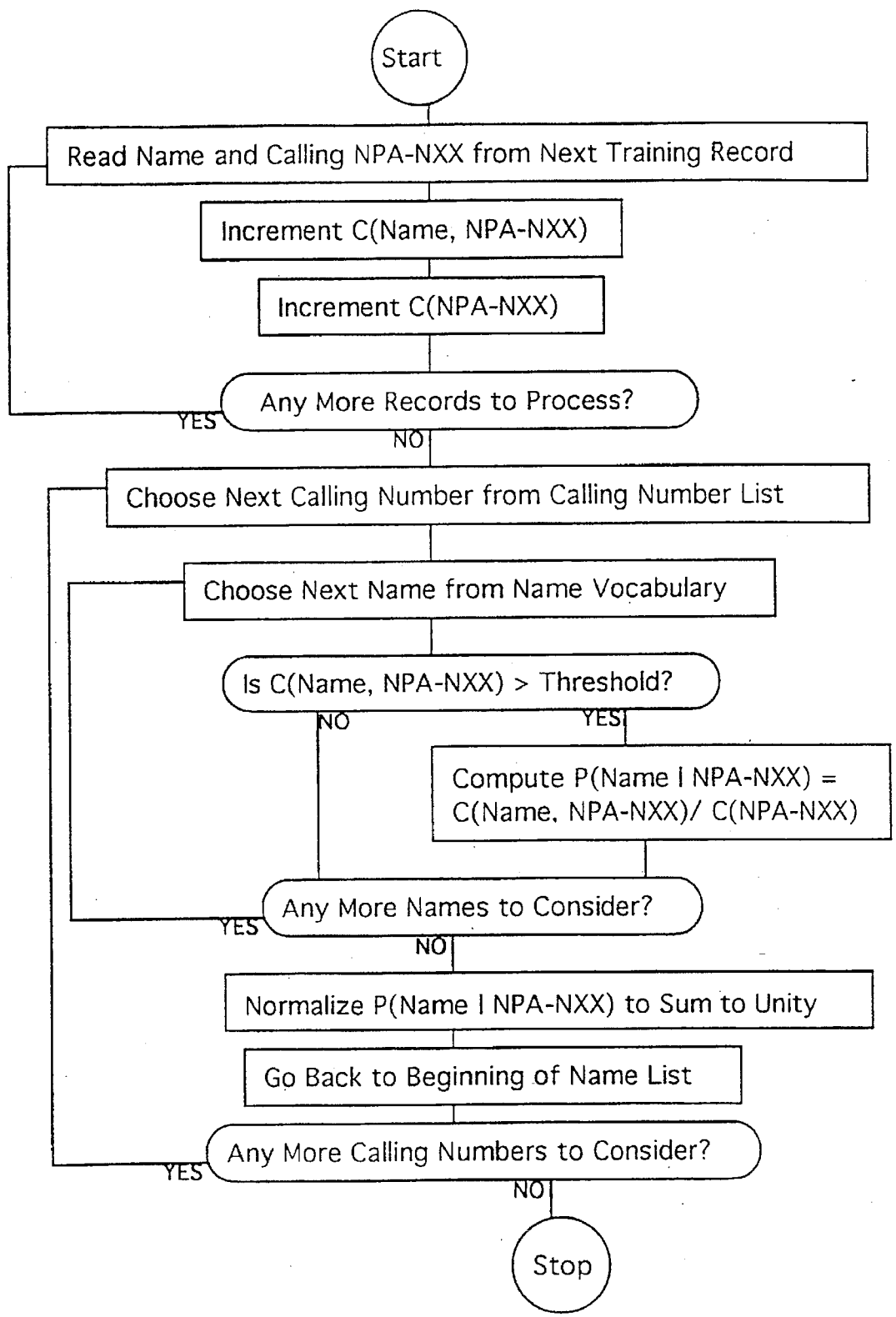
FIG. 8 is a flow chart illustrating operation of the directory assistance automation system of FIG. 2 to train a priori models used in the speech recognition algorithm illustrated in FIGS. 4A and 4B.

FIG. 8 is a flowchart illustrating automated training of the a priori models used in the speech recognition algorithm. The training records are used to count the actual number of calls from each NPA-NXX requesting each locality name, and the accumulated statistics are used to calculate the a priori probabilities of each locality name being requested given a caller's NPA-NXX. Thresholds are used to ensure that the calculated a priori models are used only where enough statistics have been accumulated to ensure statistically significant models. The modified model parameters which define the modified a priori models are stored in the off-line model parameter region 168 of the off-line memory 160.

Figure 9:
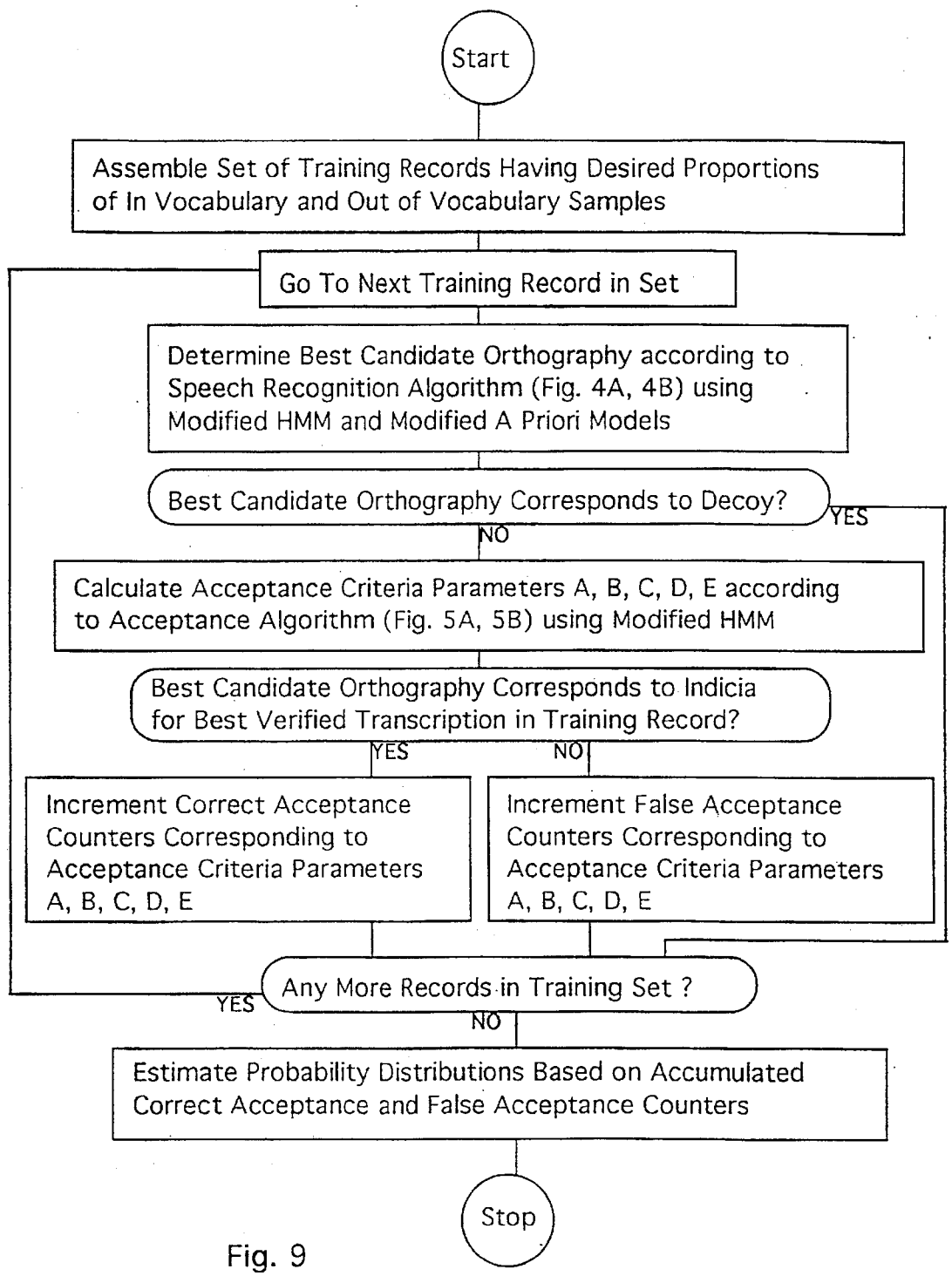
FIG. 9 is a flow chart illustrating operation of the directory assistance automation system of FIG. 2 to train probability functions used in the application of acceptance criteria as illustrated in FIGS. 5A and 5B.

FIG. 9 is a flow chart illustrating automated training of the probability models used in the application of the acceptance criteria as described above with reference to FIGS. 5A and 5B. The probability models must be trained using a set of samples having substantially the same proportions of "in vocabulary" and "out of vocabulary" samples as will be encountered in use of the system 100. While the speech signal representations collected during actual operation of the system 100 have these proportions, only about 85% of the "in vocabulary" utterances can be recognized as being "in vocabulary". The other 15% of "in vocabulary" utterances are incorrectly labelled as being "out of vocabulary"

in the training records. To restore appropriate proportions between the speech signal representations labelled with locality names and those labelled as being "out of vocabulary", only approximately 30% of the speech signal representations labelled as being "out of vocabulary" are selected for inclusion with the speech signal representations labelled with locality names in the set of training records used to train the probability models. (The relative proportions of "in vocabulary" and "out of vocabulary" utterances depends on the verbal prompts used to elicit those utterances, and must be determined empirically for a given application.)

Once the training set is determined, training of the probability models is essentially as described in U.S. Pat. No. 5,097,509. (Although the acceptance criteria parameters are different, the training technique is based on the same principles.) Locality names are referred to as "orthographies" in FIG. 9 for greater generality.

For each training record in the training set, the best locality name candidate is determined using relevant steps of speech recognition algorithm of FIGS. 4A and 4B. The steps of the speech recognition algorithm are applied using HMMs modified by the HMM training process of FIG. 7 and a priori models modified by the a priori model training process of FIG. 8.

If the best locality name candidate determined by the speech recognition algorithm is a decoy, no further calculations are performed for that training record and the next training record in the training set is selected.

If the best locality name candidate is not a decoy, acceptance criteria parameters A, B, C, D, E are calculated according to the relevant steps of the acceptance algorithm of FIGS. 5A and 5B using the HMMs modified by the HMM training process of FIG. 7. If the best locality name candidate corresponds to the locality name indicia in the training record, the modified speech recognition algorithm is considered to have correctly recognized the locality name, and correct acceptance counters corresponding to the values of each of the acceptance criteria parameters A, B, C, D, E are incremented. If the best locality name candidate does not correspond to the locality name indicia in the training record, the modified speech recognition algorithm is considered to have incorrectly recognized the locality name, and false acceptance counters corresponding to the values of each of the acceptance criteria parameters A, B, C, D, E are incremented.

Once all of the training records in the training set have been processed, the values of the correct acceptance and false acceptance counters are used to compute probability models $P_a(A)$, $P_b(B)$, $P_c(C)$, $P_d(D)$, $P_e(E)$ which estimate the probability of correct acceptance as a function of each of the acceptance criteria parameters A, B, C, D, E. Derivation of the probability models is based on techniques similar to those disclosed in U.S. Pat. No. 5,097,509 (incorporated by reference above). These techniques treat A, B, C, D, E as if they are independent variables.

The model parameters which define the modified probability models $P_a(A)$, $P_b(B)$, $P_c(C)$, $P_d(D)$, $P_e(E)$ are stored in the off-line model parameter region 168 of the off-line memory 160.

Figure 10A:
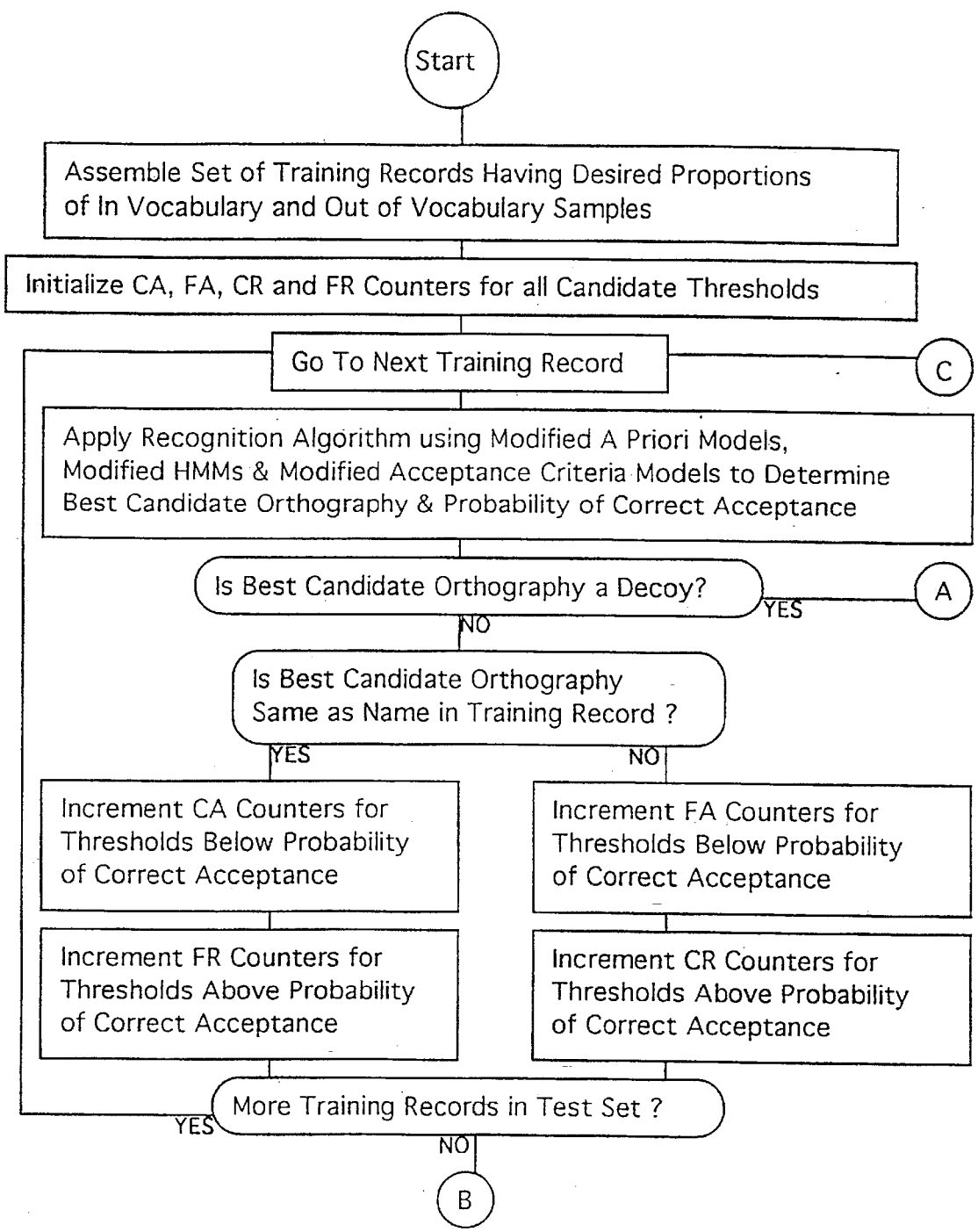
FIGS. 10A and 10B are flow charts illustrating operation of the directory assistance automation system of FIG. 2 to test the performance of speech recognition algorithms.
Figure 10B:
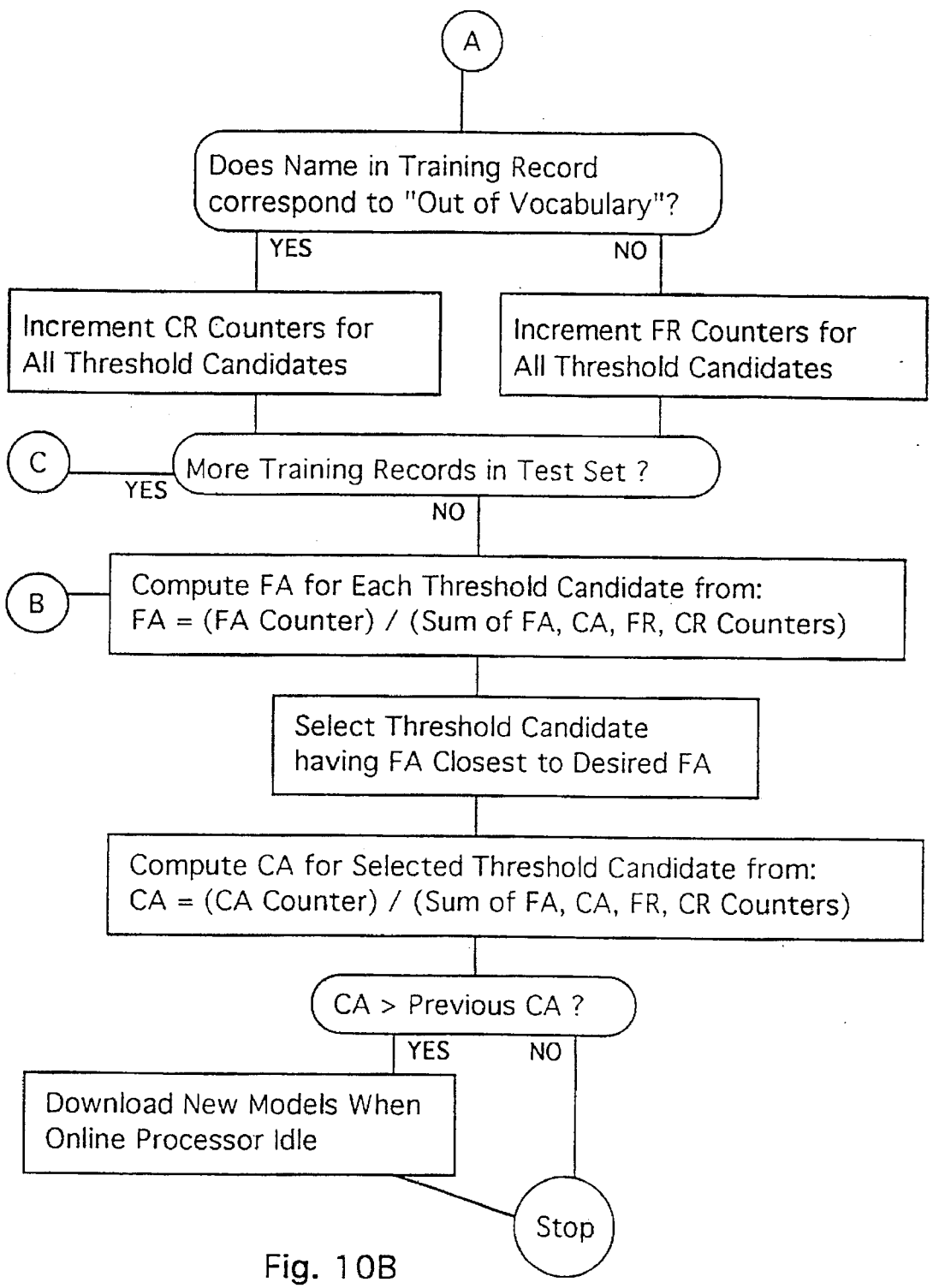

FIGS. 10A and 10B are flow charts which illustrate the training of the acceptance criteria threshold and the assessment of the speech recognition algorithm which has been modified by training of the allophone HMMs, training of the a priori models, training of the acceptance criteria probability models, and training of the acceptance criteria threshold. In FIGS. 10A and 10B, locality names are referred to as "orthographies" for greater generality.

To provide meaningful test results, the modified speech recognition algorithm must be tested on a set of training records having proportions of "in vocabulary" and "out of vocabulary" samples that are substantially the same as those that will be encountered when the modified speech recognition algorithm is applied to live traffic. Consequently, as described above with reference to training of the probability models used in applying the acceptance criteria of the speech recognition algorithm, some of the training records labelled as being "out of vocabulary" must be discarded to assemble an appropriate test set. The test set must also be assembled from training records not used to train the HMMs in order to provide meaningful test results.

Correct acceptance (CA), false acceptance (FA), correct rejection (CR) and false rejection (FR) counters are established and initialized to zero for each of 21 candidate thresholds having values of 0.00, 0.05, 0.10, . . . 1.00.

Relevant steps of the speech recognition algorithm of FIGS. 4A and 4B are applied to each training record in the training set using the HMMs modified by the training process of FIG. 7, the a priori models modified by the training process of FIG. 8 to determine the best locality name candidate for that training record. Relevant steps of the acceptance algorithm of FIGS. 5A and 5B using the acceptance criteria models derived according to FIG. 9 are applied to estimate the probability of correct acceptance of the best locality name candidate.

If the best locality name candidate is not a decoy, it is compared to the locality name recorded in the training record. If the best locality name candidate is the same as the locality name in the training record, the modified speech recognition algorithm will correctly recognize the locality name if the acceptance criteria threshold is set below the estimated probability of correct acceptance. Consequently, the correct acceptance (CA) counters for all thresholds below the estimated probability of correct acceptance are incremented. The modified speech recognition algorithm will incorrectly fail to recognize the locality name if the acceptance criteria threshold is set above the estimated probability of correct acceptance, so the false rejection (FR) counters are incremented for all thresholds above the estimated probability of correct acceptance.

If the best locality name candidate is not the same as the locality name in the training record, the modified speech recognition algorithm will incorrectly recognize the locality name if the acceptance criteria threshold is set below the estimated probability of correct acceptance. Consequently, the false acceptance (FA) counters for all thresholds below the estimated probability of correct acceptance are incremented. The modified speech recognition algorithm will correctly fail to recognize the locality name if the acceptance criteria threshold is set above the estimated probability of correct acceptance, so the correct rejection (CR) counters are incremented for all thresholds above the estimated probability of correct acceptance.

If the best locality name candidate is a decoy, and the locality name recorded in the training record corresponds to "out of vocabulary", the modified speech recognition algorithm will correctly determine that the spoken response is not a locality name in the locality name vocabulary no matter what threshold value is chosen, so the correct rejection (CR) counters for all threshold values are incremented. If the best locality name candidate is a decoy, but the locality name recorded in the training record does not correspond to "out of vocabulary", the modified speech recognition algorithm will incorrectly determine that the spoken response is not a locality name in the locality name vocabulary no matter what threshold value is chosen, so the false rejection (FR) counters for all threshold values are incremented.

Once all training records in the training set are processed as described above, the counters are used to compute the probability of false acceptance for each threshold value.

As noted above, the speech recognition algorithm is useful in the directory assistance application only if the probability of false acceptance (FA) is kept very low because false recognitions of locality names create additional work for directory assistance operators. To ensure that the directory assistance automation system 100 saves on directory assistance operating costs, the performance of the speech recognition algorithm is specified in terms of the maximum acceptable rate of false acceptances. The threshold which corresponds to the calculated probability of false acceptance which is closest to the maximum acceptable rate of false acceptances is selected.

The counters are then used to compute the probability of correct acceptance for the selected threshold value. If the probability of correct acceptance is higher than that achieved during previous training of the speech recognition algorithm, the modified speech recognition algorithm should out-perform the previous speech recognition algorithm. Consequently, the modified HMMs, a priori models, acceptance criteria probability models and acceptance criteria threshold are downloaded by the off-line processor 120 from the off-line model parameter region 168 of the off-line memory 150 to the on-line model parameter region 156 of the on-line memory 150 when the on-line processor 110 is idle. If the probability of correct acceptance is not higher than that achieved during previous training of the speech recognition algorithm, the modified models and threshold are not downloaded for use by the on-line processor 110.

Figure 11:
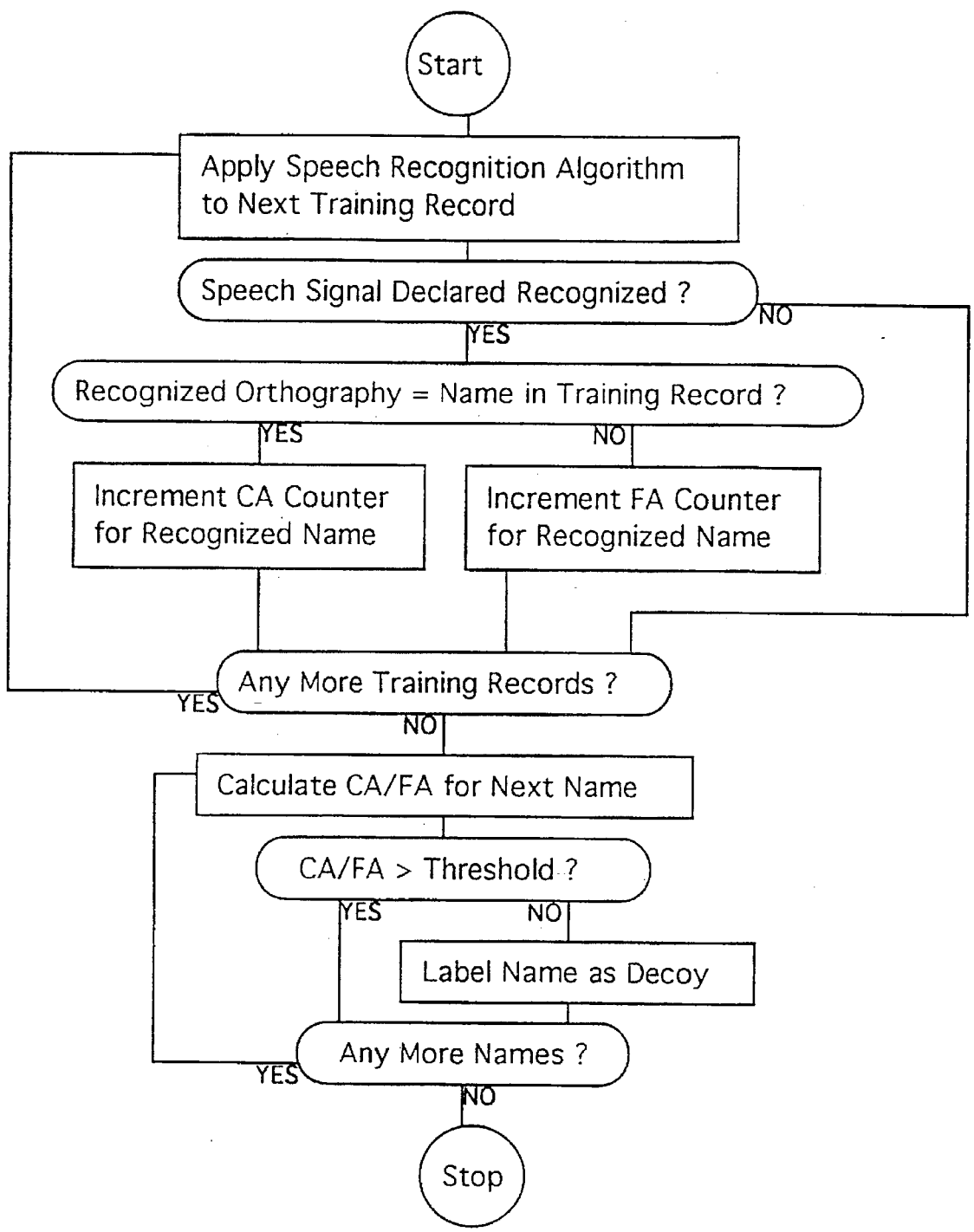
FIG. 11 is a flow chart illustrating operation of the directory assistance automation system of FIG. 2 to label certain names in a name vocabulary as decoys.

FIG. 11 is a flow chart illustrating further processing steps that may be used to improve the performance of the modified speech recognition algorithm. The modified speech recognition algorithm is applied to the speech signal representation stored in each training record. If the speech signal is declared recognized by the modified speech recognition algorithm and the recognized locality name transcription corresponds to the locality name indicia stored in the training record, a correct acceptance (CA) counter for the recognized locality name transcription is incremented. If the recognized locality name transcription does not correspond to the locality name indicia stored in the training record, a false acceptance (FA) counter for the recognized locality name transcription is incremented. If the speech signal is declared not recognized by the modified speech recognition, no counters are incremented.

When all of the training records have been processed by the modified speech recognition algorithm, the ratio of the CA and FA counters is calculated for each locality name transcription in the locality name vocabulary and compared to a predetermined threshold. Locality name transcriptions for which the ratio does not exceed the threshold are labelled as decoys so that the modified speech recognition algorithm will declare unrecognized any speech signal representation that it would otherwise recognize as that locality name transcription.

For example, if the predetermined threshold is set at unity, any locality name transcription for which the CA counter is less than the FA counter will be labelled as a decoy. This should improve the performance of the modified speech recognition algorithm because application of the modified speech recognition algorithm to the training sample indicates that recognitions of that particular locality name are more likely to be incorrect than correct. Different threshold values may be appropriate for other applications.

The embodiment described above may be modified without departing from the principles of the invention.

For example, the use of automatic speech recognition could be extended to recognize names other than locality names. In particular, the directory assistance automation system 100 could be programmed to prompt directory assistance callers for the names of people or organizations (for example businesses or government departments) they wish to call. (Such names are termed "called entity names" in this application.) The directory assistance automation system 100 could be programmed to recognize called entity names corresponding to frequently called listings. When a called entity name corresponding to a frequently called listing is recognized, the directory assistance automation system 100 could be programmed to automatically consult the directory assistance database 600 which maps the called entity names onto telephone numbers and to automatically release the required telephone number to the caller via the ARU 700 without operator intervention. In releasing the telephone number to the caller, the system could audibly announce the recognized called entity name to the caller, and ask the caller to signal in a specified manner (for example by saying "incorrect") if the recognized called entity name is incorrect. The prompting for confirmation or disconfirmation of the recognized called entity name may be performed selectively in dependence on the particular recognized called entity name so that prompting for confirmation or disconfirmation can be avoided for called entity names that the speech recognition algorithm is known already to recognize with a high degree of accuracy so as to avoid undue annoyance of directory assistance callers and unnecessary processing of training data.

The directory assistance automation system 100 could be programmed to connect the caller to an operator position 500 via the operator position controller 400 to complete the directory assistance call if a signal indicating that the recognized called entity name is incorrect is received. Alternatively, the directory assistance automation system 100 could announce the next best candidate for the called entity name and only connect the caller to an operator position 500 after a predetermined number of disconfirmed recognitions. Similarly, if the called entity name is not recognized, the directory assistance automation system 100 could automatically connect the caller to an operator position 500 via the operator position controller 400 for completion of the directory assistance call.

The directory assistance automation system 100 could be programmed to generate call records which include representations of speech signals received from callers in response to prompting for called entity names and telephone numbers released to the caller (either automatically by the directory assistance automation system 100 or manually by the operator). The directory assistance automation system 100 could further be programmed to process the call records to access a name/number database which associates called entity names in the called entity vocabulary with corresponding telephone numbers to determine whether the recognized called entity names correspond to the released telephone numbers, and to generate training records which label speech signal representations with confirmed called entity names when the called entity names correspond to the released telephone numbers. The training records could then be used to train the allophone HMMs and rejection tables as described above.

The speech recognition algorithm for called entity names may include an a priori component which weights the probability of each called entity being requested according to the NPA-NXX of the caller's telephone number and the time the call was placed. Intuitively, certain called entities are more likely to be called during business hours on business days (banks for example), while other called entities are more likely to be called after business hours or on weekends (after hours emergency lines, for example). Such calling patterns can be used to generate a priori models which estimate the probability of a called entity being requested given the time the directory assistance call was placed. The directory assistance automation system 100 could be programmed to record call times in call records, to transfer the call times to the training records, and to use the call times for confirmed recognitions to automatically train the a priori models for better performance. The a priori models based on call time could be combined with a priori models based on the caller's NPA-NXX as described above.

As described above, the directory assistance automation system 100 comprises a single on-line processor 110 and a single off-line processor 120. The system 100 could be expanded to serve several directory assistance calls simultaneously by providing several on-line processors 110, each with corresponding interfaces 130, 140, and memories 150, 160. The off-line processor 120 could process the call records collected by the several on-line processors in sequence to train the speech recognition algorithm. Multiple off-line processors 120 could be provided, each specializing in one of the training functions listed above. The off-line processor(s) 120 could be provided with their own call record memories to which call records could be downloaded from the call record memory regions 154 of the on-line memories 150 associated with each of the on-line processors 110.

As described above, the feature vectors derived from the speech signals and results of the first pass of the two pass speech algorithm are recorded in the call records produced by the on-line processor 110 for later use by the off-line processor. Alternatively, the call records produced by the on-line processor 110 could contain the digitally encoded speech signal, and the off-line processor 120 could repeat the signal processing of the speech signal to derive the feature vectors and could repeat the first pass of the two pass speech recognition algorithm to rederive these parameters.

These and other embodiments are included in the scope of the invention as defined by the following claims.

We claim:

1. A method for performing desired actions in response to speech signals, comprising:

storing representations of speech signals;

calculating, according to a speech recognition algorithm responsive to the representations of speech signals, measures of probability that the speech signals correspond to each of a plurality of actions in an action vocabulary;

selecting actions in response to the calculated measures of probability and automatically performing said actions from the action vocabulary;

acquiring further data indicative of desired actions;

calculating, according to a speech recognition algorithm responsive to both the representations of the speech signals and the further data, further measures of probability that the speech signals correspond to each of a plurality of actions;

labelling the stored representations of speech signals in response to the further calculated measures of probability; and calculating speech recognition algorithm model parameters in response to the labelled stored representations of speech signals.

2. A method as defined in claim 1, wherein at least some of the selected actions comprise providing selected items of desired information.

3. A method as defined in claim 1, wherein:

the step of automatically performing selected actions comprises prompting speakers to provide further speech signals indicative of desired actions; and the step of acquiring further data comprises calculating, according to a speech recognition algorithm responsive to the further speech signals, measures of probability that the speech signals correspond to each of a plurality of actions in an action vocabulary.

4. A method as defined in claim 3, wherein the step of prompting speakers to provide further speech signals comprises prompting speakers for disconfirmation of desired actions selected in response to previously analyzed speech signals.

5. A method as defined in claim 4, wherein the step of prompting speakers for disconfirmation is performed selectively dependent on the particular actions selected in response to previously analyzed speech signals.

6. A method as defined in claim 1, wherein the step of acquiring further data indicative of desired actions comprises monitoring for operator-initiated disconfirmations of actions selected in response to previously analyzed speech signals.

7. A method as defined in claim 6, wherein the step of monitoring for operator-initiated disconfirmations comprises monitoring for manual over-rides of actions selected in response to previously analyzed speech signals.

8. A method as defined in claim 6, wherein the step of monitoring for operator-initiated disconfirmations comprises receiving further speech signals and calculating, according to a speech recognition algorithm, measures of probability that the further speech signals correspond to disconfirmations of actions selected in response to previously analyzed speech signals.

9. A method as defined in claim 1, wherein the step of calculating, according to a speech recognition algorithm responsive to the representations of speech signals and the further data, comprises calculating, according to a speech recognition algorithm responsive to the representations of speech signals, measures of probability that the speech signals correspond to each of a plurality of actions in a restricted action vocabulary, the restricted action vocabulary being a subset of the action vocabulary selected in response to the further data.

10. A method as defined in claim 1, further comprising using the calculated speech recognition model parameters in subsequent applications of the speech recognition algorithm.

11. A method as defined in claim 1, further comprising an initial step of prompting speakers for speech signals indicative of desired actions.

* * * * *